United States Patent
Papakostas et al.

(10) Patent No.: US 10,257,297 B2
(45) Date of Patent: *Apr. 9, 2019

(54) METHODS AND APPARATUS TO IMPROVE USAGE CREDITING IN MOBILE DEVICES

(71) Applicant: The Nielsen Company (US), LLC, New York, NY (US)

(72) Inventors: Achilleas Papakostas, Dallas, TX (US); Susan Cimino, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,883

(22) Filed: Sep. 11, 2017

(65) Prior Publication Data
US 2017/0374169 A1    Dec. 28, 2017

Related U.S. Application Data

(63) Continuation of application No. 14/529,784, filed on Oct. 31, 2014, now Pat. No. 9,762,688.

(51) Int. Cl.
G06F 15/173    (2006.01)
H04L 29/08    (2006.01)
H04L 29/06    (2006.01)

(52) U.S. Cl.
CPC ............ *H04L 67/22* (2013.01); *H04L 65/105* (2013.01); *H04L 65/1066* (2013.01); *H04L 65/1083* (2013.01); *H04L 67/02* (2013.01)

(58) Field of Classification Search
CPC ....... H04L 67/22; H04L 67/02; H04L 65/105; H04L 65/1066; H04L 65/1083
USPC ................................. 709/224, 223, 217, 229
See application file for complete search history.

(56) References Cited

U.S. PATENT DOCUMENTS 4,355,372 A    10/1982  Johnson et al.
RE31,951 E     7/1985  Johnson et al.
(Continued)

FOREIGN PATENT DOCUMENTS

CA    2781018    12/2012
CA    2748997    3/2018
(Continued)

OTHER PUBLICATIONS

Boyan, "The Anonymizer—Protecting User Privacy on the Web," Computer-Mediated Communication Magazine Online! 1997, retrieved from <http://www.december.com/cmc/mag/1997/sep/boyan.html>, 1997 (6 pages). Document available in Parent U.S. Appl. No. 14/529,784.
(Continued)

*Primary Examiner* — Joseph E Avellino
*Assistant Examiner* — Marshall M McLeod
(74) *Attorney, Agent, or Firm* — Hanley, Flight & Zimmerman, LLC

(57) ABSTRACT

Methods, apparatus, systems and articles of manufacture are disclosed to identify a first request, from a first device, the first request having a first source port number. Examples disclosed herein determine whether a second request, having a second source port number, is within a threshold number of ports from the first source port number. Examples disclosed herein group the first and the second requests as a first session when the second source port number is within the threshold number of ports from the first source port number, and identify an application associated with the first session when a user agent of the first request matches a first application pattern associated with the first application, the first application pattern including a wildcard in a location corresponding to a numerical value in the user agent.

20 Claims, 10 Drawing Sheets

(56) References Cited

U.S. PATENT DOCUMENTS

| | | |
|---|---|---|
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,497,185 A | 3/1996 | Dufresne et al. |
| 5,526,427 A | 6/1996 | Thomas et al. |
| 5,550,928 A | 8/1996 | Lu et al. |
| 5,557,686 A | 9/1996 | Brown et al. |
| 5,584,050 A | 12/1996 | Lyons |
| 5,594,934 A | 1/1997 | Lu et al. |
| 5,659,469 A | 8/1997 | Deaton et al. |
| 5,675,510 A | 10/1997 | Coffey et al. |
| 5,689,799 A | 11/1997 | Dougherty et al. |
| 5,710,887 A | 1/1998 | Chelliah et al. |
| 5,715,399 A | 2/1998 | Bezos |
| 5,732,218 A | 3/1998 | Bland et al. |
| 5,737,025 A | 4/1998 | Dougherty et al. |
| 5,737,026 A | 4/1998 | Lu et al. |
| 5,751,450 A | 5/1998 | Robinson |
| 5,771,307 A | 6/1998 | Lu et al. |
| 5,781,913 A | 7/1998 | Felsenstein et al. |
| 5,790,875 A | 8/1998 | Andersin et al. |
| 5,848,396 A | 12/1998 | Gerace |
| 5,850,249 A | 12/1998 | Massetti et al. |
| 5,862,325 A | 1/1999 | Reed et al. |
| 5,872,850 A | 2/1999 | Klein et al. |
| 5,887,140 A | 3/1999 | Itsumi et al. |
| 5,889,548 A | 3/1999 | Chan |
| 5,961,593 A | 10/1999 | Gabber et al. |
| 5,970,469 A | 10/1999 | Scroggie et al. |
| 5,991,735 A | 11/1999 | Gerace |
| 6,006,260 A | 12/1999 | Barrick, Jr. et al. |
| 6,026,367 A | 2/2000 | Hjelmvik et al. |
| 6,026,368 A | 2/2000 | Brown et al. |
| 6,052,730 A | 4/2000 | Felciano et al. |
| 6,055,573 A | 4/2000 | Gardenswartz et al. |
| 6,058,381 A | 5/2000 | Nelson |
| 6,070,145 A | 5/2000 | Pinsley et al. |
| 6,070,148 A | 5/2000 | Mori et al. |
| 6,081,900 A | 6/2000 | Subramaniam et al. |
| 6,115,680 A | 9/2000 | Coffee et al. |
| 6,128,624 A | 10/2000 | Papierniak et al. |
| 6,138,162 A | 10/2000 | Pistriotto et al. |
| 6,138,165 A | 10/2000 | Nakatsugawa |
| 6,141,686 A | 10/2000 | Jackowski et al. |
| 6,151,593 A | 11/2000 | Cho et al. |
| 6,286,043 B1 | 9/2001 | Cuomo et al. |
| 6,286,046 B1 | 9/2001 | Bryant |
| 6,321,336 B1 | 11/2001 | Applegate et al. |
| 6,351,467 B1 | 2/2002 | Dillon |
| 6,381,632 B1 | 4/2002 | Lowell |
| 6,421,733 B1 | 7/2002 | Tso et al. |
| 6,449,251 B1 | 9/2002 | Awadallah et al. |
| 6,487,538 B1 | 11/2002 | Gupta et al. |
| 6,507,589 B1 | 1/2003 | Ramasubramani et al. |
| 6,567,857 B1 | 5/2003 | Gupta et al. |
| 6,606,581 B1 | 8/2003 | Nickerson et al. |
| 6,658,414 B2 | 12/2003 | Bryan et al. |
| 6,704,787 B1 | 3/2004 | Umbreit |
| 6,839,680 B1 | 1/2005 | Liu et al. |
| 6,856,963 B1 | 2/2005 | Hurwitz |
| 6,865,613 B1 | 3/2005 | Miller et al. |
| 6,993,590 B1 | 1/2006 | Gauthier et al. |
| 7,003,555 B1 | 2/2006 | Jungck |
| 7,039,599 B2 | 5/2006 | Merriman et al. |
| 7,065,505 B2 | 6/2006 | Stefik et al. |
| 7,080,077 B2 | 7/2006 | Ramamurthy et al. |
| 7,092,926 B2 | 8/2006 | Cerrato |
| 7,092,942 B2 | 8/2006 | Frieden et al. |
| 7,159,023 B2 | 1/2007 | Tufts |
| 7,181,412 B1 | 2/2007 | Fulgoni et al. |
| 7,200,632 B1 | 4/2007 | Greschler et al. |
| 7,216,149 B1 | 5/2007 | Briscoe et al. |
| 7,260,837 B2 | 8/2007 | Abraham et al. |
| 7,277,915 B2 | 10/2007 | De Boor et al. |
| 7,366,724 B2 | 4/2008 | Frieden et al. |
| 7,375,641 B2 | 5/2008 | Kiel et al. |
| 7,376,722 B1 | 5/2008 | Sim et al. |
| 7,526,538 B2 | 4/2009 | Wilson |
| 7,584,423 B2 | 9/2009 | Rohrabaugh et al. |
| 7,606,897 B2 | 10/2009 | Izrailevsky et al. |
| 7,613,809 B2 | 11/2009 | Jackson et al. |
| 7,688,813 B2 | 3/2010 | Shin et al. |
| 7,695,879 B2 | 4/2010 | Vanbesien et al. |
| 7,814,483 B2 | 10/2010 | Li et al. |
| 7,849,502 B1 | 12/2010 | Bloch et al. |
| 8,086,219 B2 | 12/2011 | O'Neil et al. |
| 8,285,218 B2 | 10/2012 | Papakostas et al. |
| 8,307,006 B2 | 11/2012 | Hannan et al. |
| 8,340,711 B1 | 12/2012 | Glass et al. |
| 8,594,617 B2 | 11/2013 | Papakostas et al. |
| 8,635,129 B2 | 1/2014 | Story et al. |
| 8,755,511 B2 | 6/2014 | Duva et al. |
| 8,886,773 B2 | 11/2014 | Papakostas et al. |
| 8,910,259 B2 | 12/2014 | Papakostas et al. |
| 9,301,173 B2 | 3/2016 | Papakostas |
| 9,307,418 B2 | 4/2016 | Papakostas et al. |
| 9,762,688 B2 | 9/2017 | Papakostas et al. |
| 2001/0014915 A1 | 8/2001 | Blumeneau |
| 2001/0020242 A1 | 9/2001 | Gupta et al. |
| 2002/0069368 A1 | 6/2002 | Hines |
| 2002/0077903 A1 | 6/2002 | Feldman et al. |
| 2002/0116523 A1 | 8/2002 | Warrier et al. |
| 2002/0128803 A1 | 9/2002 | Skinner et al. |
| 2002/0144156 A1 | 10/2002 | Copeland, III |
| 2002/0169830 A1 | 11/2002 | Mild et al. |
| 2002/0178257 A1 | 11/2002 | Cerrato |
| 2003/0009762 A1 | 1/2003 | Hooper et al. |
| 2003/0018778 A1 | 1/2003 | Martin et al. |
| 2003/0033432 A1 | 2/2003 | Simpson et al. |
| 2003/0035409 A1 | 2/2003 | Wang et al. |
| 2003/0051052 A1 | 3/2003 | Shteyn et al. |
| 2003/0065595 A1 | 4/2003 | Anglum |
| 2003/0076305 A1 | 4/2003 | Allen |
| 2003/0091025 A1 | 5/2003 | Celi, Jr. et al. |
| 2003/0154306 A1 | 8/2003 | Perry |
| 2003/0195884 A1 | 10/2003 | Boyd et al. |
| 2004/0133687 A1 | 7/2004 | Yamaguchi et al. |
| 2004/0205159 A1 | 10/2004 | Johnson et al. |
| 2005/0021603 A1 | 1/2005 | Yokomitsu et al. |
| 2005/0108539 A1 | 5/2005 | Skog et al. |
| 2005/0138192 A1 | 6/2005 | Encarnacion et al. |
| 2005/0198261 A1 | 9/2005 | Durvasula et al. |
| 2005/0201357 A1 | 9/2005 | Poyhonen |
| 2006/0133332 A1 | 8/2006 | Achanta |
| 2006/0258341 A1 | 11/2006 | Miller et al. |
| 2006/0264202 A1 | 11/2006 | Hagmeier et al. |
| 2006/0274774 A1 | 12/2006 | Srinivasan et al. |
| 2006/0274775 A1 | 12/2006 | Kyung et al. |
| 2007/0073625 A1 | 3/2007 | Shelton |
| 2007/0089110 A1 | 4/2007 | Li |
| 2007/0123760 A1 | 5/2007 | Scholler et al. |
| 2007/0214501 A1 | 9/2007 | Muramoto et al. |
| 2007/0222598 A1 | 9/2007 | Kiel et al. |
| 2007/0274211 A1 | 11/2007 | Tsubota |
| 2008/0005736 A1 | 1/2008 | Apacible et al. |
| 2008/0056261 A1 | 3/2008 | Osborn et al. |
| 2008/0289010 A1 | 11/2008 | Frieden et al. |
| 2009/0034536 A1 | 2/2009 | Morand et al. |
| 2009/0089356 A1 | 4/2009 | Murray et al. |
| 2009/0106035 A1 | 4/2009 | Xu et al. |
| 2009/0233633 A1 | 9/2009 | Morrison |
| 2009/0282471 A1 | 11/2009 | Green et al. |
| 2009/0285118 A1 | 11/2009 | Yoshikawa et al. |
| 2009/0296917 A1 | 12/2009 | Nogawa |
| 2009/0320123 A1 | 12/2009 | Yu et al. |
| 2010/0036969 A1 | 2/2010 | Perry et al. |
| 2010/0095215 A1 | 4/2010 | Elven |
| 2010/0191947 A1 | 7/2010 | Shin |
| 2010/0205029 A1 | 8/2010 | Asherman et al. |
| 2010/0205617 A1 | 8/2010 | Hogan et al. |

(56) References Cited

U.S. PATENT DOCUMENTS

| | | | |
|---|---|---|---|
| 2010/0216434 | A1 | 8/2010 | Marcellino et al. |
| 2010/0238837 | A1 | 9/2010 | Zheng |
| 2010/0293610 | A1 | 11/2010 | Beachem et al. |
| 2011/0047254 | A1 | 2/2011 | Vainionpaa et al. |
| 2011/0252430 | A1 | 10/2011 | Chapman et al. |
| 2011/0296416 | A1 | 12/2011 | Kim et al. |
| 2012/0007932 | A1 | 1/2012 | Yokoyama et al. |
| 2012/0042005 | A1 | 2/2012 | Papakostas et al. |
| 2012/0042367 | A1 | 2/2012 | Papakostas et al. |
| 2012/0158908 | A1 | 6/2012 | Luna et al. |
| 2012/0210321 | A1 | 8/2012 | Silva et al. |
| 2012/0216063 | A1 | 8/2012 | Ogata |
| 2012/0235930 | A1 | 9/2012 | Lazaridis et al. |
| 2012/0295581 | A1 | 11/2012 | Agarwal |
| 2013/0005296 | A1 | 1/2013 | Papakostas et al. |
| 2013/0006708 | A1 | 1/2013 | Lee |
| 2013/0031599 | A1 | 1/2013 | Luna et al. |
| 2013/0035059 | A1 | 2/2013 | Liu et al. |
| 2013/0054402 | A1 | 2/2013 | Asherman et al. |
| 2013/0064109 | A1 | 3/2013 | Combet et al. |
| 2013/0066875 | A1 | 3/2013 | Combet et al. |
| 2013/0183926 | A1 | 7/2013 | Lindberg et al. |
| 2013/0276129 | A1 | 10/2013 | Nelson et al. |
| 2013/0281050 | A1 | 10/2013 | Agarwal et al. |
| 2014/0036687 | A1 | 2/2014 | Papakostas et al. |
| 2014/0273923 | A1 | 9/2014 | Papakostas |
| 2014/0280896 | A1 | 9/2014 | Papakostas et al. |
| 2015/0058958 | A1 | 2/2015 | Papakostas et al. |
| 2015/0067162 | A1 | 3/2015 | Papakostas et al. |
| 2016/0127488 | A1 | 5/2016 | Papakostas et al. |
| 2016/0232539 | A1 | 8/2016 | Papakostas et al. |

FOREIGN PATENT DOCUMENTS

| | | |
|---|---|---|
| CN | 1909739 | 2/2007 |
| CN | 101594443 | 12/2009 |
| CN | 101605030 | 12/2009 |
| CN | 102377616 | 3/2012 |
| CN | 102917003 | 2/2013 |
| CN | 105025081 | 11/2015 |
| EP | 1980950 | 10/2008 |
| EP | 2079256 | 7/2009 |
| EP | 2341437 | 7/2011 |
| EP | 2549713 | 1/2013 |
| GB | 2437842 | 11/2007 |
| JP | 2003219467 | 7/2003 |
| JP | 2004342080 | 12/2004 |
| JP | 2005115473 | 4/2005 |
| JP | 2007200209 | 8/2007 |
| JP | 2008511229 | 4/2008 |
| JP | 2009514050 | 4/2009 |
| JP | 2010079831 | 4/2010 |
| KR | 1020050008068 | 1/2005 |
| WO | 9641495 | 12/1996 |
| WO | 9831155 | 7/1998 |
| WO | 0055783 | 9/2000 |
| WO | 0111506 | 2/2001 |
| WO | 0144975 | 6/2001 |
| WO | 0152462 | 7/2001 |
| WO | 0250694 | 6/2002 |
| WO | 03067376 | 8/2003 |
| WO | 2006044820 | 4/2006 |
| WO | 2007123760 | 11/2007 |

OTHER PUBLICATIONS

Canadian Intellectual Property Office, "Notice of Allowance," issued in connection with Canadian Patent Application No. 2,749,013, dated Nov. 4, 2014 (1 page). Document available in Parent U.S. Appl. No. 14/529,784.

Canadian Intellectual Property Office, "Office Action," issued in connection with Canadian Patent Application No. 2,749,013, dated Oct. 6, 2015 (4 pages). Document available in Parent U.S. Appl. No. 14/529,784.

Canadian Intellectual Property Office, "Office Action," issued in connection with Canadian Patent Application No. 2,749,013, dated Sep. 10, 2013 (2 pages). Document available in Parent U.S. Appl. No. 14/529,784.

Canadian Intellectual Property Office, "Notice of Allowance," issued in connection with Canadian Patent Application No. 2,748,997, dated Mar. 16, 2015 (1 page). Document available in Parent U.S. Appl. No. 14/529,784.

Canadian Intellectual Property Office, "Office Action," issued in connection with Canadian Patent Application No. 2,748,997, dated Nov. 24, 2015 (5 pages). Document available in Parent U.S. Appl. No. 14/529,784.

Canadian Intellectual Property Office, "Office Action," issued in connection with Canadian Patent Application No. 2,748,997, dated Nov. 21, 2013 (2 pages). Document available in Parent U.S. Appl. No. 14/529,784.

Canadian Intellectual Property Office, "Notice of Allowance," issued in connection with Canadian Patent Application No. 2,781,018, dated Apr. 16, 2015 (1 page). Document available in Parent U.S. Appl. No. 14/529,784.

Canadian Intellectual Property Office, "Office Action," issued in connection with Canadian Patent Application No. 2,781,018, dated Apr. 7, 2014 (3 pages). Document available in Parent U.S. Appl. No. 14/529,784.

Choo et al., "A Behavioral Model of Information Seeking on the Web—Preliminary Results of a Study of How Managers and IT Specialists Use the Web," Oct. 1998 (16 pages). Document available in Parent U.S. Appl. No. 14/529,784.

Diffie et al, "Privacy and Authentication: An Introduction to Cryptography," Proceedings of the IEEE, vol. 67, No. 3, Mar. 1979 (32 pages). Document available in Parent U.S. Appl. No. 14/529,784.

Dossick et al., "WWW Access to Legacy Client/Server Applications," Fifth International World Wide Web Conference, May 6-10, 1996, retrieved from <http://iw3c2.cs.ust.hk/WWW5/www5conf.inria.fr/fich_html/papers/P4/Overview.html>, retrieved on Sep. 1, 2010 (12 pages). Document available in Parent U.S. Appl. No. 14/529,784.

European Patent Office, "Extended European Search Report," issued in connection with European Patent Application No. 11006705.5, dated Oct. 14, 2011 (7 pages). Document available in Parent U.S. Appl. No. 14/529,784.

European Patent Office, "Partial European Search Report," issued in connection with European Patent Application No. 12004911.9 dated Dec. 13, 2012 (8 pages). Document available in Parent U.S. Appl. No. 14/529,784.

European Patent Office, "Extended European Search Report," issued in connection with European Patent Application No. 12004911.9 dated Apr. 3, 2013 (11 pages). Document available in Parent U.S. Appl. No. 14/529,784.

European Patent Office, "Communication under Rule 71(3) EPC," issued in connection with European Patent Application No. 12004911.9 dated Feb. 2, 2016 (74 pages). Document available in Parent U.S. Appl. No. 14/529,784.

European Patent Office, "Partial European Search Report," issued in connection with European Patent Application No. 11006706.3, dated Oct. 25, 2011 (7 pages). Document available in Parent U.S. Appl. No. 14/529,784.

European Patent Office, "Extended European Search Report," issued in connection with European Patent Application No. 11006706.3, dated Apr. 5, 2012 (15 pages). Document available in Parent U.S. Appl. No. 14/529,784.

Apple Support Communities, "HTTP Proxy Authentication and Iphone Apps," Jan. 15, 2009, retrieved from <http://discussions.apple.com/message/8018666#8018666>, retrieved on Dec. 5, 2011 (4 pages). Document available in Parent U.S. Appl. No. 14/529,784.

International Searching Authority, "Interational Preliminary Report on Patentability," issued in connection with International Patent Application No. PCT/US2014/028176, dated Sep. 15, 2015 (7 pages). Document available in Parent U.S. Appl. No. 14/529,784.

(56) References Cited

OTHER PUBLICATIONS

International Searching Authority, "Interational Search Report and Written Opinion," issued in connection with International Patent Application No. PCT/US2014/028176, dated Sep. 1, 2014 (11 pages). Document available in Parent U.S. Appl. No. 14/529,784.
IP Australia, "Patent Examination Report No. 1," issued in connection with Australian Patent Application No. 2014218363, dated Nov. 6, 2015 (3 pages). Document available in Parent U.S. Appl. No. 14/529,784.
IP Australia, "Patent Examination Report No. 1," issued in connection with Australian Patent Application No. 2014210640, dated May 27, 2015 (4 pages). Document available in Parent U.S. Appl. No. 14/529,784.
IP Australia, "Notice of Grant," issued in connection with Australian Patent Application No. 2011211444, dated Aug. 21, 2014 (2 pages). Document available in Parent U.S. Appl. No. 14/529,784.
IP Australia, "Notice of Acceptance," issued in connection with Australian Patent Application No. 2011211444, dated Apr. 29, 2014 (2 pages). Document available in Parent U.S. Appl. No. 14/529,784.
IP Australia, "Patent Examination Report No. 1," issued in connection with Australian Patent Application No. 2011211444, dated Apr. 2, 2013 (3 pages). Document available in Parent U.S. Appl. No. 14/529,784.
IP Australia, "Notice of Acceptance" issued in connection with Australian Patent Application No. 2012203829, dated Jun. 12, 2014 (2 pages). Document available in Parent U.S. Appl. No. 14/529,784.
IP Australia, "Notice of Grant" issued in connection with Australian Patent Application No. 2012203829, dated Oct. 9, 2014 (2 pages). Document available in Parent U.S. Appl. No. 14/529,784.
IP Australia, "Examination Report" issued in connection with Australian Patent Application No. 2012203829, dated May 21, 2013 (3 pages). Document available in Parent U.S. Appl. No. 14/529,784.
IP Australia, "Patent Examination Report No. 1," issued in connection with Australian Patent Application No. 2011211443, dated Apr. 2, 2013 (3 pages). Document available in Parent U.S. Appl. No. 14/529,784.
Japan Patent Office, "Notice of Reasons for Rejection," issued in connection with Japanese Patent Application No. P2011-177687, dated Aug. 21, 2012 (3 pages). Document available in Parent U.S. Appl. No. 14/529,784.
Japan Patent Office, "Notice of Reasons for Rejection," issued in connection with Japanese Patent Application No. P2011-177687, dated Jun. 4, 2013 (7 pages). Document available in Parent U.S. Appl. No. 14/529,784.
Japan Patent Office, "Notice of Reasons for Rejection," issued in connection with Japanese Patent Application No. P2012-145685, dated May 7, 2013 (4 pages). Document available in Parent U.S. Appl. No. 14/529,784.
Japan Patent Office, "Notice of Reasons for Rejection," issued in connection with Japanese Patent Application No. P2011-177690, dated Jun. 25, 2013 (12 pages). Document available in Parent U.S. Appl. No. 14/529,784.
Japan Patent Office, "Notice of Reasons for Rejection," issued in connection with Japanese Patent Application No. P2011-177690, dated Aug. 21, 2012 (4 pages). Document available in Parent U.S. Appl. No. 14/529,784.
Papakostas et al., "Systems, Methods, and Apparatus to Monitor Mobile Internet Usage," U.S. Appl. No. No. 13/840,594, filed Mar. 15, 2013 (74 pages). Document available in Parent U.S. Appl. No. 14/529,784.
Srivastava et al, "Web Usage Mining: Discovery and Applications of Usage Patterns from Web Data," ACM SIGKDD Explorations Newsletter, vol. 1, Issue 2, Jan. 2000 (12 pages). Document available in Parent U.S. Appl. No. 14/529,784.
State Intellectual Property Office of China, "First Notification of Office Action," issued in connection with Chinese Patent Application No. 201210296506.2, dated Sep. 2, 2014 (21 pages). Document available in Parent U.S. Appl. No. 14/529,784.
State Intellectual Property Office of China, "Notice of Allowance," issued in connection with Chinese Patent Application No. 201210296506.2, dated Mar. 18, 2015 (5 pages). Document available in Parent U.S. Appl. No. 14/529,784.
State Intellectual Property Office of China, "First Notification of Office Action," issued in connection with Chinese Patent Application No. 201110294045.0, dated Sep. 26, 2013 (24 pages). Document available in Parent U.S. Appl. No. 14/529,784.
State Intellectual Property Office of China, "Second Notification of Office Action," issued in connection with Chinese Patent Application No. 201110294045.0, dated Apr. 3, 2014 ( 5 pages). Document available in Parent U.S. Appl. No. 14/529,784.
State Intellectual Property Office of China, "Notice of Allowance," issued in connection with Chinese Patent Application No. 201110294045.0, dated Jul. 4, 2014 ( 5 pages). Document available in Parent U.S. Appl. No. 14/529,784.
State Intellectual Property Office of China, "First Notification of Office Action," issued in connection with Chinese Patent Application No. 201110305485.1, dated Sep. 22, 2013 (22 pages). Document available in Parent U.S. Appl. No. 14/529,784.
United States Patent and Trademark Office, "Non-Final Office Action," issued in connection with U.S. Appl. No. 13/840,594, dated Sep. 19, 2014 (11 pages). Applicant will provide document upon request from Examiner.
United States Patent and Trademark Office, "Notice of Allowance," issued in connection with U.S. Appl. No. 13/840,594, dated May 26, 2015 (8 pages). Applicant will provide document upon request from Examiner.
United States Patent and Trademark Office, "Notice of Allowance," issued in connection with U.S. Appl. No. 13/840,594, dated Nov. 17, 2015 (8 pages). Applicant will provide document upon request from Examiner.
United States Patent and Trademark Office, "Final Office Action," issued in connection with U.S. Appl. No. 13/840,594, dated Mar. 11, 2015 (17 pages). Applicant will provide document upon request from Examiner.
United States Patent and Trademark Office, "Advisory Action," issued in connection with U.S. Appl. No. 12/856,651, dated Nov. 22, 2013 (2 pages). Applicant will provide document upon request from Examiner.
United States Patent and Trademark Office, "Final Office Action," issued in connection with U.S. Appl. No. 12/856,651, dated Aug. 28, 2013 (16 pages). Applicant will provide document upon request from Examiner.
United States Patent and Trademark Office, "Non-Final Office Action," issued in connection with U.S. Appl. No. 12/856,651, dated Mar. 27, 2012 (11 pages). Applicant will provide document upon request from Examiner.
United States Patent and Trademark Office, "Pre-Brief Appeal Conference Decision," issued in connection with U.S. Appl. No. 12/856,651, dated Jan. 13, 2014 (2 pages). Applicant will provide document upon request from Examiner.
United States Patent and Trademark Office, "Notice of Allowance," issued in connection with U.S. Appl. No. 12/856,651, dated Jul. 7, 2014 (11 pages). Applicant will provide document upon request from Examiner.
United States Patent and Trademark Office, "Office Communication," issued in connection with U.S. Appl. No. 12/856,651, dated Sep. 10, 2014 (2 pages). Applicant will provide document upon request from Examiner.
United States Patent and Trademark Office, "Notice of Allowance," issued in connection with U.S. Appl. No. 12/856,643, dated Apr. 10, 2014 (14 pages). Applicant will provide document upon request from Examiner.
United States Patent and Trademark Office, "Advisory Action," issued in connection with U.S. Appl. No. 12/856,643, dated Nov. 4, 2013 (2 pages). Applicant will provide document upon request from Examiner.
United States Patent and Trademark Office, "Notice of Allowance," issued in connection with U.S. Appl. No. 12/856,643, dated Aug. 5, 2014 (5 pages). Applicant will provide document upon request from Examiner.

(56) References Cited

OTHER PUBLICATIONS

United States Patent and Trademark Office, "Final Office Action," issued in connection with U.S. Appl. No. 12/856,643, dated May 9, 2013 (10 pages). Applicant will provide document upon request from Examiner.
United States Patent and Trademark Office, "Non-Final Office Action," issued in connection with U.S. Appl. No. 12/856,643, dated Jun. 18, 2012 (8 pages). Applicant will provide document upon request from Examiner.
United States Patent and Trademark Office, "Notice of Allowance," issued in connection with U.S. Appl. No. 13/174,517, dated Aug. 22, 2013 (19 pages). Applicant will provide document upon request from Examiner.
United States Patent and Trademark Office, "Notice of Allowance," issued in connection with U.S. Appl. No. 13/174,517, dated Oct. 25, 2013 (2 pages). Applicant will provide document upon request from Examiner.
United States Patent and Trademark Office, "Notice of Allowability," issued in connection with U.S. Appl. No. 13/174,517, dated Sep. 26, 2013 (2 pages). Applicant will provide document upon request from Examiner.
United States Patent and Trademark Office, "Non-Final Office Action," issued in connection with U.S. Appl. No. 13/174,517, dated Aug. 15, 2012 (12 pages). Applicant will provide document upon request from Examiner.
United States Patent and Trademark Office, "Non-Final Office Action," issued in connection with U.S. Appl. No. 13/840,543 dated May 21, 2015 (15 pages). Applicant will provide document upon request from Examiner.
United States Patent and Trademark Office, "Final Office Action," issued in connection with U.S. Appl. No. 13/840,543 dated Jan. 20, 2016 (17 pages). Applicant will provide document upon request from Examiner.
United States Patent and Trademark Office, "Non-Final Office Action," issued in connection with U.S. Appl. No. 14/041,613, dated Aug. 6, 2015 (10 pages). Applicant will provide document upon request from Examiner.
United States Patent and Trademark Office, "Notice of Allowance," issued in connection with U.S. Appl. No. 14/041,613, dated Nov. 25, 2015 (9 pages). Applicant will provide document upon request from Examiner.
Finjan Software Inc., "User Identification and Authentication—Vital Security 9.2," Finjan Vital Security, 1996-2008, retrieved from <http://m86security.com/software/secure_web_gateway/manuals.9.2.0/User_Identification_and Authentication.pdf>, Apr. 25, 2010 (27 pages). Document available in Parent U.S. Appl. No. 14/529,784.
Wavecrest Computing, "Cyfin Proxy User Manual for Version 8.2.x," XP55009573, retrieved from <http://downloads.wavecrest.net/release/cyfin/manuals/v820/cyfinProxyManual.pdf>, Apr. 9, 2010 (147 pages). Document available in Parent U.S. Appl. No. 14/529,784.
Zenel et al., "A General Purpose Proxy Filtering Mechanism Applied to the Mobile Environment," Wireless Networks, ACM, vol. 5, No. 5, Oct. 1999 (9 pages). Document available in Parent U.S. Appl. No. 14/529,784.
European Patent Office, Communication Pursuant to Article 94(3) EPC, issued in connection with European Application No. 11006706.3, Mar. 21, 2016, (9 pages). Document available in Parent U.S. Appl. No. 14/529,784.
United States Patent and Trademark Office, "Notice of Allowance," issued in connection with U.S. Appl. No. 14/537,484, dated Apr. 13, 2017 (10 pages). Applicant will provide document upon request from Examiner.
Intellectual Property Office of China, "First Notification of Office Action," issued in connection with Chinese Patent Application No. 201410432742.1, dated Mar. 29, 2017, 16 pages. Document available in Parent U.S. Appl. No. 14/529,784.
United States Patent and Trademark Office, "Non-Final Office Action," issued in connection with U.S. Appl. No. 14/537,488, dated Apr. 8, 2016 (41 pages). Applicant will provide document upon request from Examiner.
United States Patent and Trademark Office, "Final Office Action," issued in connection with U.S. Appl. No. 14/537,488, dated Oct. 21, 2016 (27 pages). Applicant will provide document upon request from Examiner.
United States Patent and Trademark Office, "Notice of Allowance," issued in connection with U.S. Appl. No. 14/529,784, dated Apr. 26, 2017 (9 pages). Applicant will provide document upon request from Examiner.
United States Patent and Trademark Office, "Non-Final Office Action," issued in connection with U.S. Appl. No. 14/529,784, dated Aug. 5, 2016 (42 pages). Applicant will provide document upon request from Examiner.
United States Patent and Trademark Office, "Final Office Action," issued in connection with U.S. Appl. No. 14/529,784, dated Jan. 26, 2017 (21 pages). Applicant will provide document upon request from Examiner.
United States Patent and Trademark Office, "Non-Final Office Action," issued in connection with U.S. Appl. No. 14/537,488, dated Jun. 30, 2017 (30 pages). Applicant will provide document upon request from Examiner.
Canadian Intellectual Property Office, "Office Action," issued in connection with Canadian Application No. 2749013, dated Jul. 24, 2017, 3 pages.
Intellectual Property India, "$1^{st}$ Examination Report," issued in connection with Indian Patent Application No. 2320/DEL/2011, dated Aug. 29, 2017, 5 pages.
State Intellectual Preoprty Office of China, "Second Notification of Office Action", issued in connection with Chinese Patent Application No. 201410432742.1, dated Nov. 16, 2017, (15 pages).
European Patent Office, "Communication Pursuant to Article 94(3) EPC," issued in connection with European Patent Application No. 11006705.5, on Nov. 6, 2017, 4 pages.
The State Intellectual Property Office of China, "3rd Notification of Office Action", issued in connection with Chinese Patent Application No. 2014103432742.1, dated Apr. 23, 2018, (7 pages).
Intellectual Property Office of Canada, "Office Action," Issued in connection with application No. 2749013, dated Jun. 4, 2018, 4 pages.
United States Patent and Trademark Office, "Non-Final Office Action," issued in connection with U.S. Appl. No. 14/537,488, dated Jun. 28, 2018, 35 pages. (Applicant will provide document upon request from Examiner. ).
United States Patent and Trademark Office, "Non-Final Office Action," issued in connection with U.S. Appl. No. 13/840,543, dated Nov. 17, 2017, 77 pages. (Applicant will provide document upon request from Examiner. ).
United States Patent and Trademark Office, "Final Office Action," issued in connection with U.S. Appl. No. 14/537,488, dated Jan. 19, 2018, 19 pages. (Applicant will provide document upon request from Examiner. ).
United States Patent and Trademark Office, "Advisory Action," issued in connection with U.S. Appl. No. 14/537,488, dated Apr. 19, 2018, 8 pages. (Applicant will provide document upon request from Examiner. ).

122

| | 310 | 315 | 320 | 330 | 340 | |
|---|---|---|---|---|---|---|
| | DEVICE ID | SRC. PORT | DEST. PORT | TIMESTAMP | HTTP REQUEST | |
| 350 | cPhone 5x | 54806 | 50000 | 6:00:00 PM | GET http://app.sportsapp.com/home.html HTTP/1.1<br>Host: proxy.MonitoringEntity.com:50000<br>User-Agent: <SportsApp/5.1 mOS/6.2 ARNet/41.3.7/> | 342 |
| 360 | cPhone 5x | 54817 | 50000 | 6:01:23 PM | GET http://app.sportsapp.com/article1.html HTTP/1.1<br>Host: proxy.MonitoringEntity.com:50000<br>User-Agent: <SportsApp/5.1 mOS/6.2 ARNet/41.3.7/> | 343 |
| 370 | cPhone 5x | 54800 | 50000 | 6:04:43 PM | GET http://ad.seatspot.com/ HTTP/1.1<br>Host: proxy.MonitoringEntity.com:50000<br>User-Agent: <EmbAd/1.1 ARNet/9.14.7/> | 344 |
| 380 | cPhone 5x | 54850 | 50000 | 6:15:39 PM | GET https://api.twitter.com/user_timeline.rss<br>Host: proxy.MonitoringEntity.com:50000<br>User-Agent: <Twitter-cPhone/5.3 mOS/6.1(cPhone5x)/> | |
| 390 | cPhone 5x | 54863 | 50000 | 6:17:42 PM | GET http://bannerad.net/ad1.html HTTP/1.1<br>Host: proxy.MonitoringEntity.com:50000<br>User-Agent: <EmbAd/1.1 ARNet/9.14.7/> | |
| 395 | cPhone 5x | 54869 | 50000 | 6:27:57 PM | GET https://api.twitter.com/user_timeline.rss<br>Host: proxy.MonitoringEntity.com:50000<br>User-Agent: <Twitter-cPhone/5.3 mOS/6.1(cPhone5x)/> | |
| | ... | ... | ... | ... | ... | |

FIG. 3

METHODS AND APPARATUS TO IMPROVE USAGE CREDITING IN MOBILE DEVICES

CROSS REFERENCE TO RELATED APPLICATIONS

This patent arises from a continuation of U.S. patent application Ser. No. 14/529,784, filed Oct. 31, 2014, now U.S. Pat. No. 9,762,688. U.S. patent application Ser. No. 14/529,784 is hereby incorporated herein by reference in its entirety.

FIELD OF THE DISCLOSURE

This disclosure relates generally to media monitoring, and, more particularly, to improving usage crediting in mobile devices.

BACKGROUND

In recent years, mobile devices have become ubiquitous to daily life for quickly accessing Internet based media. For example, it is becoming increasingly rare to come across someone not using a mobile device to access media on demand. Recently, such devices have become capable of utilizing applications not designed solely for browsing the Internet to access Internet based media.

BRIEF DESCRIPTION OF THE DRAWINGS

FIG. 3 is an example illustration of a proxy log from the proxy server of FIG. 1.

DETAILED DESCRIPTION

Figure 1:
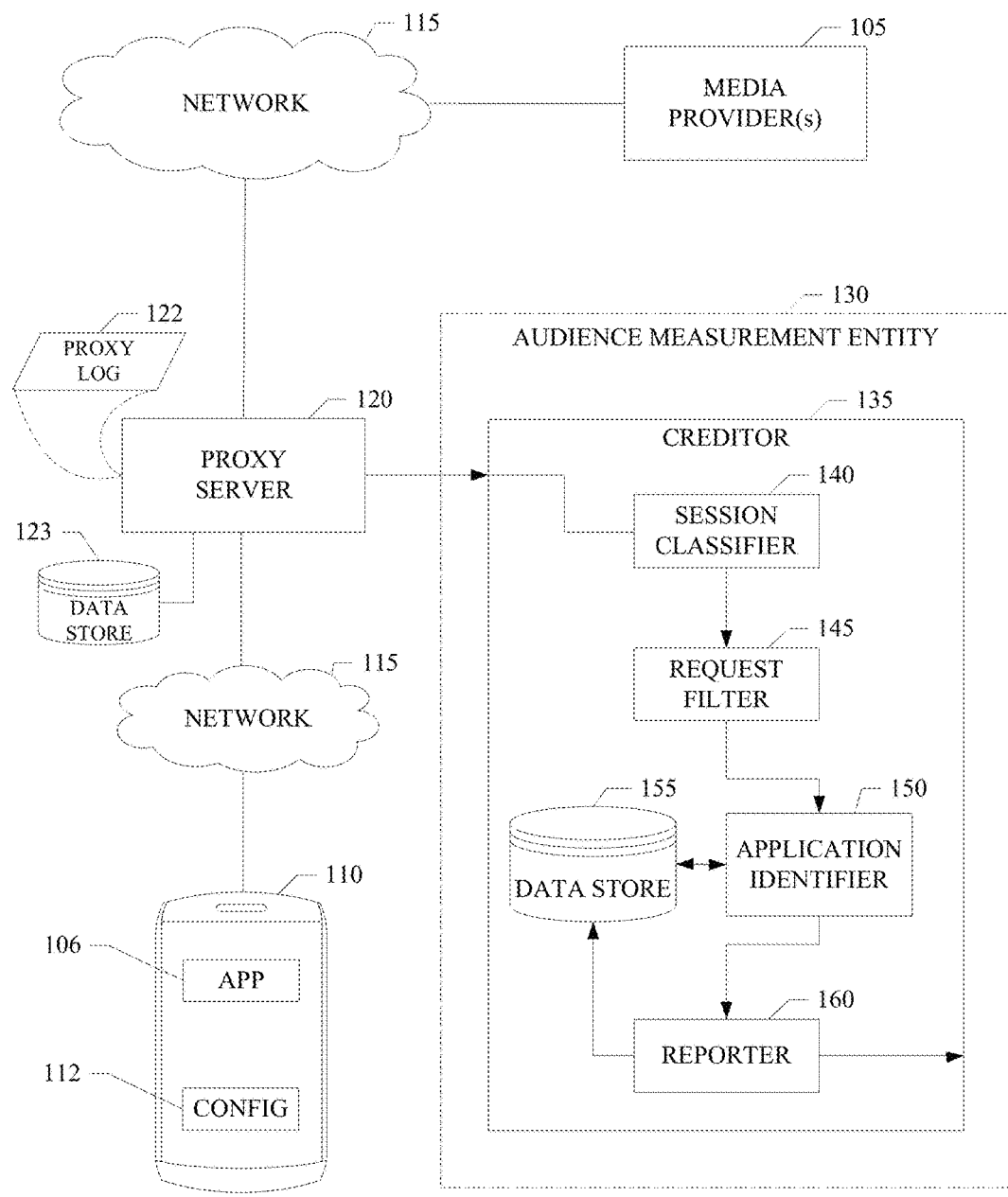
FIG. 1 is a block diagram of an example system constructed in accordance with the teachings of this disclosure to improve usage crediting in mobile devices.

Monitoring companies desire to gain knowledge on how users interact with mobile devices such as, for example, a smartphones. For example, monitoring companies want to monitor Internet traffic to and/or from the mobile devices to, among other things, monitor exposure to advertisements, determine advertisement effectiveness, determine user behavior, identify purchasing behavior associated with various demographics, credit application usage, etc. Examples disclosed herein facilitate such monitoring at a proxy server.

Examples disclosed herein identify applications with which hypertext transfer protocol (HTTP) messages received at a proxy server are associated. In examples disclosed herein, requests associated with browser and/or media presentation application traffic (e.g., HTTP requests) received at a proxy server are grouped into sessions based on the port numbers of these requests. In further examples disclosed herein, the sessions are classified as associated with a specific application using user agent data contained in the requests.

In examples disclosed herein, HTTP requests routed through a proxy server are processed to extract data and/or metadata associated with the transmission of the HTTP request. Accordingly, data and/or metadata from each HTTP request are recorded into a proxy log and are associated with a user corresponding to the destination port number. Such extracted data and/or metadata may be, for example, a source port, a destination port, a Universal Resource Locator (URL), a user agent, a media type, a timestamp, etc. The proxy log may be subsequently used to credit the usage of the applications executing on the device.

When a mobile device makes a request for media, the mobile device sends a request using an HTTP protocol. Each HTTP request (and corresponding response) that originates at the device is associated with two ports: the source port (e.g., a port on the mobile device) and destination port (e.g., a port on the proxy server). The ports are numbers (typically from 0 to 65535) contained in the header of the packet (e.g., Transmission Control Protocol (TCP), User Datagram Protocol (UDP), etc.) containing the request used to further route traffic beyond the Internet protocol (IP) address. The port number is used in conjunction with an Internet Protocol (IP) address to identify, route, and receive data on a device connected to a packet switched network (e.g., the Internet). Certain ports are not available for use if those ports are associated with other Internet services. For example, ports 0 through 1023 are defined as Well Known Ports by the Internet Assigned Numbers Authority (IRNA), and are prohibited from use without IANA registration.

In some examples, an assigned port for communication may be an ephemeral port that is allocated and valid for use only for the duration of a communication session for which it is utilized. When the communication session is completed and/or terminated, the ephemeral port is free to be reused at the discretion of the device (e.g., a mobile device and/or a server). Source and/or Destination ports may be ephemeral.

For example, data to be forwarded to a particular application on a device will be transmitted to the IP address of the device (e.g., 192.168.1.2) and will include a port number. For example, the device forwarding the data assigns the port number in a predefined range designated for application specific communication. After the data is received at the designated IP address, the data is further routed at the device to an application (and/or application process) associated with the data using the specified port number. In some examples, an application executing on a device use process-specific ports to properly and efficiently make use of network connectivity. As further requests are generated and fulfilled, the existing ports may "close" (e.g., cease to be used) and subsequent ports having higher or lower numbers will open (e.g., a new number will be used). Additionally or alternatively, some closed ports may be reused for other processes to conserve port numbers.

An HTTP request may include a user agent field. A user agent field in an HTTP request may contain information about an application generating the request (e.g., Firefox™, Twitter™, etc.), an operating system version of the device the request originated from (e.g., iOS™ 7), a hardware version of the device transmitting a request (e.g., iPhone 5S), a rendering platform used by the application (e.g., WebKit, Gecko, etc.), and/or abilities of the versions of the application generating the request (e.g., LiveMeeting, etc.).

Example user agent data originating from the mobile Twitter™ application may be populated according to the following: "Twitter-iPhone/3.5.1 iOS/6.0." The portion, "Twitter-iPhone/3.5.1" designates that the application making the HTTP request is version 3.5.1 of the Twitter™ iPhone application. The portion, "iOS/6.0" indicates that the operating system of the device making the HTTP request is iOS™ version 6.0.

In examples disclosed herein, a device monitored using a proxy server transmits requests using a destination port number that identifies the device sending the traffic and, in extension, the actual user with that device. For example, when configuring the device for monitoring, a unique destination port number is assigned to each panelist for transmitting requests to the proxy server provided by a monitoring company (e.g., The Nielsen Company (US), LLC.). In such an example, the destination port/panelist association is stored at the proxy device. In other examples the destination port/panelist association is stored at a monitoring company. All traffic routed through the proxy server for a particular user will be identifiable by (and associated with) the destination port number. Example systems, methods, and apparatus for configuring a mobile device to interact with a proxy are disclosed in U.S. patent application Ser. Nos. 12/856,651, 12/856,643, 13/174,517, each of which is hereby incorporated by reference in its entirety.

Additionally, an HTTP request transmitted from a mobile device contain a source port number associated with an applications and/or application process that is making the request. The source port numbers may be assigned by the device or they may be requested by, or registered to, the application making the HTTP request. For example, when an application launches (or becomes active after a period of suspension) on a mobile device, an initial block of HTTP requests within a range of port numbers (e.g., a range comprising ten ports, a range comprising fifty ports, etc.) are transmitted to a server. Typically, this range of ports is sufficient for all activity associated with the application until closing or being suspended. In some examples, the HTTP requests are all associated with the application. In other examples, the HTTP requests are associated with the application and processes associated with the application. For example, other applications or processes integrated with other applications (e.g., the ability to use the email application of the mobile device, advertisement retrieval, etc.) may generate HTTP requests within this range.

As an application executes, additional HTTP requests outside of the initial block of requests may be sent based on user interaction with the application (e.g., un-common processes, extended usage, advertisement retrieval, etc.). For example, if each of the ports in the initial range is in use, or not released for subsequent use, an application may generate a new HTTP request on a port outside the initial block of requests (e.g., the initial range of ports). To this end, the initial block of requests changes to a current block of requests. That is, as requests outside the initial block are generated, the initial block of request becomes a current range including a highest port number and a lowest port number. Each HTTP request made by the application (or processes associated with the application, such as advertisement retrieval, for example) outside of the initial range is typically within fifteen ports of the highest and/or lowest value of the current range. When a new browser and/or media presentation application is launched on the mobile device, a jump of at least fifteen ports is observed in the associated traffic at the proxy server. Using this characteristic, traffic associated with a user at a proxy server may be grouped into sessions that represent application-specific traffic by processing the source port numbers of records in a proxy log.

In examples disclosed herein, when HTTP requests are grouped, a session identification may be associated to the each record in the proxy log. The session identification is a unique alphanumeric identifier added to records that are determined to belong to the same session. For every identified session (e.g., grouping) of HTTP requests in the proxy log, a new session identification is created and associated to the corresponding requests.

After grouping the HTTP requests into sessions, wildcarded search strings of the user agents in the requests are used to identify what application is associated with the corresponding records in the proxy log. That is, the numeric values of the user agents are replaced with a character or group of characters that act as wildcard replacements (e.g., "% D") in the search string. Alternatively, the URLs of the HTTP request may have portions of the URL wildcarded with string-indicative wildcards (e.g., "% S"). This prevents a large number of parallel classifications. For example, a fifth release of a sports application (e.g., "SportsApp/5.0") executing on the sixth iteration of an operating system (e.g., "mOS/6.0") may produce a large number of different user agents through combination of all previous iterations (e.g., "SportsApp/x.0 mOS/x.0"). By removing the version numbers, only one user agent would be a valid match indicating the application (e.g., "SportsApp/%D mOS/%D").

The individual sessions are classified using the wildcarded user agent search string. The HTTP requests in the proxy log are accessed by session and each session classified. In classification, the records in each session are compared to dynamic rules which are used to identify to which application this session belongs. Using logical rules, these sessions are classified and the usage is attributed to a corresponding application.

Some applications utilize protocols other than HTTP such as, for example, HTTP Secure (HTTPS). Accordingly, while the examples disclosed herein are described with reference to the HTTP protocol, any other past, present, and/or future protocol and/or format of communication may additionally or alternatively be used such as, for example, HTTP secure (HTTPS), File Transfer Protocol (FTP), etc.

FIG. 1 is a block diagram of an example environment in which example methods apparatus and/or articles of manufacture disclosed herein may be used for crediting application usage. In the example environment of FIG. 1, data is transmitted from a media provider 105 to an example application 106 executing on example mobile device 110. The transmission of data in the illustrated example FIG. 1 is performed through an example proxy server 120 capable of storing data in an example data store 123. The example environment includes the example mobile device 110, the proxy server 120, the media provider 105, and an example creditor 135. In the example of FIG. 1, an audience measurement entity 130, such as The Nielsen Company (US), LLC, operates an example creditor 135 to credit application usage.

In the illustrated example, the mobile device 110 is associated with a panelist who has agreed to be monitored by the audience measurement entity 130. Panelists are users registered on panels maintained by a ratings entity (e.g., the audience measurement entity 130) that owns and/or operates the creditor 135. Traditionally, audience measurement entities (also referred to herein as "ratings entities") determine demographic reach for advertising and media programming based on registered panel members. That is, an audience measurement entity 130 enrolls people that consent to being monitored into a panel. During enrollment, the audience measurement entity 130 receives demographic information from the enrolling people so that subsequent correlations may be made between advertisement/media exposure to those panelists and different demographic markets.

People become panelists via, for example, a user interface presented on the mobile device 110. People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In the panelist system of the illustrated example of FIG. 1, consent is obtained from the user to monitor and/or analyze network data when the user joins and/or registers for the panel. For example, the panelist may agree to have their Internet traffic of the mobile device monitored by the proxy server 120. Although the example system of FIG. 1 is a panelist-based system, non-panelist and/or hybrid panelist systems may additionally and/or alternatively be employed. The example mobile device 110 communicates with the example media provider 105 via the proxy server 120 using the network 115.

The example network 115 may be any type of communications network, (e.g., the Internet, a local area network, a wide area network, a cellular data network, etc.) facilitated by a wired and/or wireless connection (e.g., a cable/DSL/satellite modem, a cell tower, etc.). The example network may be a local area network, a wide area network, or any combination of networks.

Upon enrollment, the panelist and/or mobile device (e.g., the mobile device 110) are assigned configuration information 112 including a unique destination port number to route Internet traffic through at an Internet Protocol (IP) address of the proxy server 120, for example. Using the mobile device 115 according to the configuration information 112 allows the Internet traffic to be attributed to the panelist and/or the mobile device 110.

In the illustrated example, the example mobile device 110 generates HTTP requests to transmit to the media provider 105 to obtain data. The HTTP requests are routed, based on the configuration information 112, through the example proxy server 120 at the unique destination port. The example proxy server 120 extracts (or replicates) data and/or metadata from the HTTP request and stores the request in a record of a proxy log 122 associated with the unique destination port number. For example, the example proxy server 120 extracts a timestamp of the request, a source port, a destination port, a user agent, and URL from the HTTP request.

When the data and/or metadata has been extracted, the example proxy server 120 routes the HTTP request to the example media provider 105 which acknowledges the request and returns the data to the example mobile device 110 through the example proxy server 120. The proxy log 122 is transmitted to the audience measurement entity 130 by the example proxy server 120. In some examples the proxy log 122 is transmitted in a periodic fashion (e.g., hourly, daily, weekly, etc.), in other examples, the proxy log 122 is transmitted in an aperiodic fashion (e.g., on request, when certain conditions are met, etc.).

In the illustrated example, the HTTP requests are transmitted using the Transmission Control Protocol and/or the User Datagram Protocol. However, any past, present, and/or future protocol may be utilized in the illustrated environment 100 providing that such protocols transmit port information and user agent data.

The example mobile device 110 of FIG. 1 is a handheld mobile device. While in the illustrated example the mobile device 110 is shown as a cellular phone, any other type of device may be used. For example, other types of phones (e.g., an Apple® iPhone®), a laptop computer, a desktop computer, a personal digital assistant (PDA), a netbook, or a tablet computer (e.g., an Apple® iPad™) may additionally or alternatively be used. The mobile device 110 may be implemented with any mobile operating system, and may be implemented with any type of hardware and/or form factor. In the illustrated example, the mobile device 110 communicates via a wireless interface. However, any other type(s) of communication interface may additionally or alternatively be used such as, for example, an Ethernet connection, a Bluetooth connection, a Wi-Fi connection, a cellular connection (e.g., a Time Division Multiple Access (TDMA) connection, Code Division Multiple Access (CDMA) connection, Worldwide Interoperability for Microwave Access (WiMAX) connection, Long Term Evolution (LTE) connection, etc.).

The example proxy server 120 of the illustrated example is a network device located in a separate location from a monitored household that acts as an intermediary for communications (e.g., HTTP requests and responses) involving the example mobile device 110. Alternatively, the example proxy server 120 may be located in the monitored household. For example, the example proxy server 120 may be a router, a gateway, a server, and/or any device capable of acting as a network traffic intermediary. For example, a broadband modem and/or router may implement the proxy server 120. According to the illustrated example, the proxy server 120 is an intermediary for communications between the example mobile device 110 and the example media provider 105.

The example proxy server 120 is involved in communications associated with the example mobile device 110 and therefore, the example proxy server 120 is capable of gathering information about those communications. The proxy server 120 may not perform functions typically associated with a proxy (e.g., performing packet translation). Rather, the functions of the proxy server 105 described in examples herein, may be performed by any type of device to collect information about communications between the example mobile device 110 and the example media provider 105 (e.g., the example proxy server 120 may not participate in the communication chain and, instead, may monitor the communications from the sidelines using, for example, packet mirroring, packet snooping, or any other technique).

In the illustrated example of FIG. 1, the proxy server 120 receives requests from the mobile device 110. The requests of the mobile device 110 are received by the proxy server 120 based on configuration information 112 (e.g., the proxy server address, the unique destination port number, a username, a password, etc.) provided to the panelist and/or mobile device 110. The configuration information 112 causes the mobile device 110 to transmit all subsequent requests through the proxy server 120.

The proxy server 120 retrieves the requested data from the media provider 105 (or from a local cache if, for example, the media has previously been requested and stored). As disclosed above, to identify the panelist associated with the request, communication to and from each specific panelist occurs over the uniquely assigned (e.g., dedicated) port. Thus, each panelist is assigned a unique port and no other panelist communicates via that port. In some examples multiple proxy servers are used to expand the number of panelists and/or devices supported by the monitoring system. In such examples the proxy server address and port number combination is uniquely assigned to the panelists and/or devices. In some examples, each panelist/device pair is assigned a unique port number to facilitate differentiation between usage of a first device (e.g., a phone) by a panelist and usage of a second device (e.g., an iPad) by the same panelist.

While the communication between a mobile device 110 and the proxy server 120 occurs over a single port, communication between the proxy server 120 and the media providers 105 may be implemented over any port. After retrieving the requested data from the media provider 105, in the illustrated example the data is relayed to the requesting mobile device 110 via the port assigned to the mobile device.

In the example FIG. 1, the proxy log 122 is transmitted from the example proxy server 120 to the example creditor 135 of the example audience measurement entity 130. At the example creditor 135, the proxy log 122 is processed to generate groupings (e.g., sessions) of the records based on the originating port numbers of the requests. The records in each session are compared to example model user agents. If a session is determined by the example creditor 135 as indicative of a certain application, the session is classified as belonging to the certain application. Accordingly, the session usage is credited to the certain application. If the session is unable to be classified by the example creditor 135 (e.g., not determined to match a model user agent), the session is stored so that classification may be attempted at a later time (e.g., when more example user agents have been gathered by the example creditor 135 and/or provided to the system).

The example creditor 135 of FIG. 1 is provided with an example session classifier 140, an example request filter 145, an example application identifier 150, an example data store 155, and an example reporter 160.

The example session classifier 140 of FIG. 1 obtains the proxy log 122 from the example proxy server 120. The example session classifier 140 groups the records of the proxy log 122 into sessions using the source port identified in the record of the proxy log 122 as illustrated in greater detail in FIGS. 4A-4F. In some examples, the example session classifier 140 adds (e.g., appends, prepends, inserts, etc.) a session identifier to the user agent of the request. The session identifier may be an alphanumeric string, a hexadecimal value, or any other representative value. In the example FIG. 1, the example session classifier 140 is in communication with the request filter 145.

The example request filter 145 accesses the sessioned proxy log 122 from the example session classifier 140 to generate search strings having the numerical values from user agent data filtered out via wildcarding. That is, by generating user agent search strings deficient of, for example, version values, the example request filter 145 generates user agent search strings capable of identifying application traffic irrespective of application version. For example, the example request filter 145 replaces the numerical values occurring after forward slashes in the user agent with wildcarded characters. As disclosed earlier, user agent data contains indentifying information regarding the application (and application version) generating the HTTP request. Because applications are not uniformly updated across all devices, many different versions may be used on an according amount of devices. Accordingly, wildcards (e.g., "%D") are used when filtering the user agents to enable accurate identification of the originating application regardless of the version of the application. This has the effect of condensing several possible session identifications of different versions of the same application into a uniform session identification for the application regardless of version. In the illustrated example of FIG. 1, the example request filter 145 generates a search string, which is a wildcarded user agent, by obtaining the user agent and replacing the numeric values in the user agent string with "%D". Of course any such replacement character or group of characters may be implemented to act as the wildcarded character.

The example application identifier 150 of the illustrated example classifies the sessions identified by the example session classifier 140 using the filtered records of the session provided by the request filter 145. In the illustrated example, Boolean logic (e.g., AND, OR, etc.) associated with application model user agents (e.g., an expected wildcarded user agent associated with a corresponding application) is applied to each of the records in the session. For example, the application identifier 150 accesses each identified session and analyzes the records in the identified session against logical expressions indicative of originating applications stored in the example data store 155 until a match is found. For example, URL patterns are used to identify the originating application.

In some examples, user agents employed by certain applications are generic and, therefore, do not point to a specific application making the requests in the session. For example, the user agent utilized by a streaming media application may use a generic browser user agent. In these particular examples, when a user agent is not indicative of an application, the URLs of the HTTP requests in the session are analyzed by the application identifier 150 in the same way as the user agents are analyzed above.

In the illustrated example, the example reporter 160 reports the identified sessions to the data store 155 and/or an external actor at the audience measurement entity 130. The example reporter 160 also credits the application identified by the example application identifier 150 with a usage duration of the session. For example, the identified application is credited for exposure to the panelist associated with the destination port. If a session is unable to be classified, the example reporter 160 tags the session for a later attempt at classification by the application session identifier 150. In some examples, the example reporter 160 presents a group of unclassified sessions having matching application model user agents and/or URLs for external classification. In other examples, the group of unclassified sessions may be preliminarily classified by the example application session identifier 150 and reported externally by the example reporter 160 for approval.

In some examples, the example reporter 160 extracts the unidentified session records into a discrete file that is placed in an auxiliary classification queue. In some such examples, the auxiliary classification queue may be accessed at a later time when additional application model user agents and/or URLs have been added to the data store 155 for use in classification.

While an example manner of implementing the example creditor 135 of FIG. 1 is illustrated in FIG. 1, one or more of the elements, processes and/or devices illustrated in FIG. 1 may be combined, divided, re-arranged, omitted, eliminated and/or implemented in any other way. Further, the example session classifier 140, the example request filer 145, the example application identifier 150, the example data store 155, the example reporter 160 and/or, more generally, the example creditor 135 of FIG. 1 may be implemented by hardware, software, firmware and/or any combination of hardware, software and/or firmware. Thus, for example, any of the example session classifier 140, the example request filer 145, the example application identifier 150, the example data store 155, the example reporter 160 and/or, more generally, the example creditor 135 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example session classifier 140, the example request filer 145, the example application identifier 150, the example data store 155, the example reporter 160 and/or, more generally, the example creditor 135 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example creditor 135 of FIG. 1 may include one or more elements, processes and/or devices in addition to, or instead of, those illustrated in FIG. 1, and/or may include more than one of any or all of the illustrated elements, processes and devices.

Figure 2:
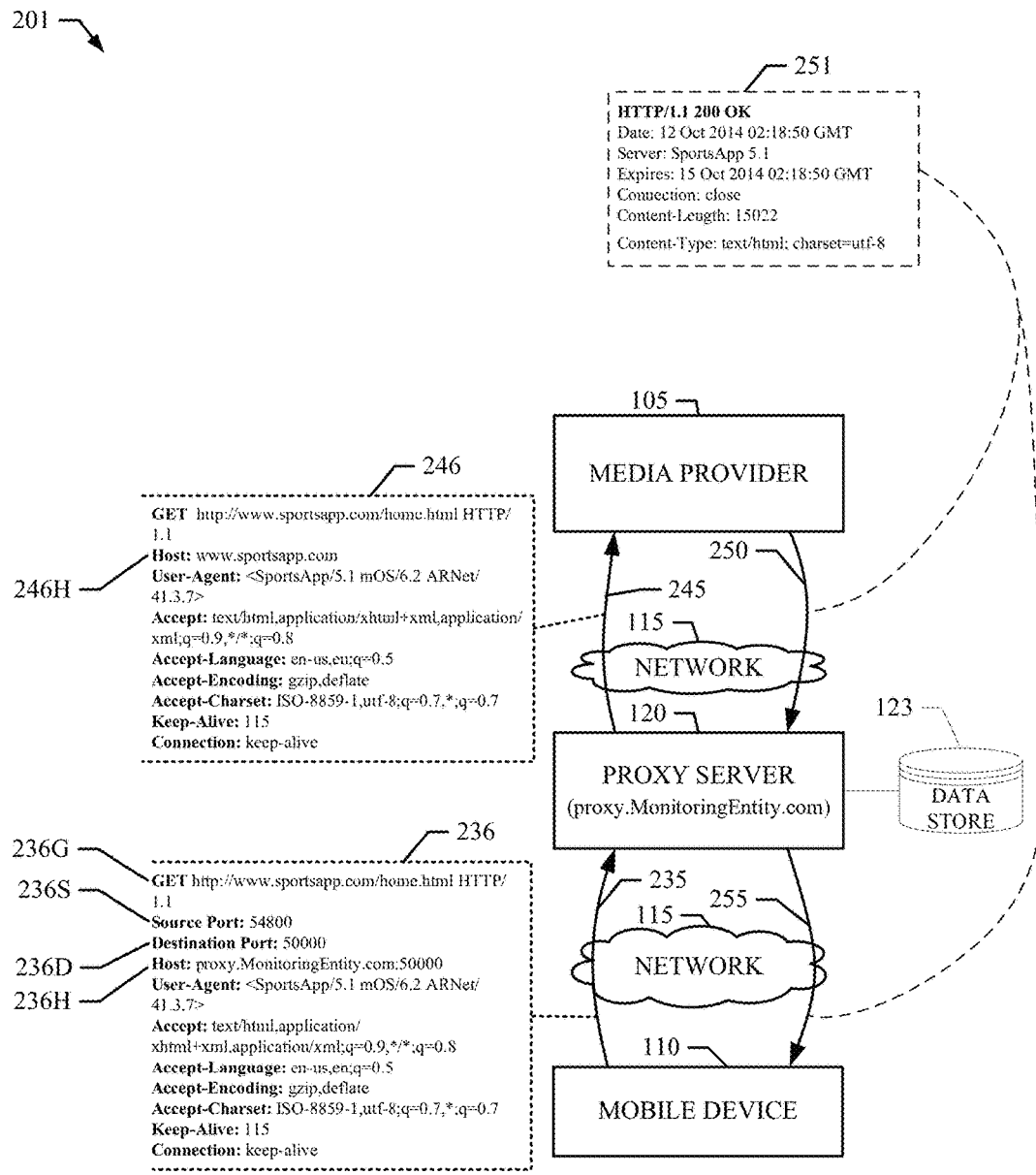
FIG. 2 is a block diagram illustrating an example HTTP request flowing through the example system of FIG. 1.

FIG. 2 is a block diagram 201 illustrating an example request and response flow through the example system of FIG. 1. The block diagram 201 includes the proxy server 120 and the proxy server data store 123, the media provider 105, the mobile device 110, and network 115. The block diagram 201 additionally includes a first request 235, a second request 245, a first response 250, and a second response 255. Further, the requests are represented by HTTP request headers. The first request 235 is represented by the first HTTP request header 236 and the second request 245 is represented by the second HTTP request header 246.

The first request 235 originates from the example mobile device 110 as a request for media from a media provider 105 in response to user interaction with an application on the mobile device 110. The first request 235 is transmitted to the proxy server 120 via the example network 115. The proxy server 120 communicates with the media provider 105 via a second request 245. The second request 245 is sent from the proxy server 120 to the media provider 105 on behalf of the mobile device 110. The media provider 105 responds to the second request 245 with a message to the proxy server 120 (e.g., response 251). The response 251 is transmitted to the corresponding mobile device 110.

The first HTTP request header 236 is the header of a GET request (e.g., 236G) generated by the mobile device 110. In the illustrated example, the media provider 105 is identified by the absolute URL identified in the first line of the first HTTP request header 236 and the address of the proxy 115 and uniquely assigned port are identified by the "Host" line 236H of the first HTTP request header 236. The first request is identified as originating from source port 236S 54800 on the mobile device 110. The host identified in the illustrated example 236H is proxy.MonitoringEntity.com, and the destination port 236D that the request was made to is 50000. However, any other address identifying the proxy server 120 and any other port may alternatively be used. For example, the address identifying the proxy 115 may be the Internet Protocol (IP) address of the proxy 115. In the illustrated example, the absolute URL of the Internet resource is "http://www.sportsapp.com/home.html." However, any other URL may additionally or alternatively be used.

The proxy 115 receives the first media request 235 and generates the second media request 245. The second media request 245 is represented by the second HTTP request header 246. In the illustrated example, the second HTTP request header 246 is a GET request directed to host 246H "http://www.sportsapp.com." The media being requested from host 246H "http://www.sportsapp.com" in the illustrated example is "/home.html." The proxy server 120 generates the second request by inspecting the first request 235. For example, the proxy server 120 identifies the requested media of the first request 235 as "http://www.sportsapp.com/home.html," determines that the media provider 105 identified is "www.sportsapp.com," and determines that the requested webpage from the media provider is "/home.html."

In some examples, the media identified by a first media request 235 may be media that is provided on a port other than the default communication port. (e.g., port 80). For example, the mobile device 110 may seek to request media that is hosted on port 1234, rather than the default port (e.g., port 80 which is the default standard port for HTTP content). In such an example, an absolute URL of a first HTTP request header identifies the requested media as "http://www.sportsapp.com:1234/home.html," to convey that the media identified by the request is provided on port 1234 (rather than the default port). Further, in such an example, the proxy server 120 generates a second HTTP request header that identifies port 1234 (e.g., www.sportsapp.com:1234).

The media provider 105 receives the second media request 245, and responds to the request via the first response 250 that is sent to the proxy server 120. The proxy server 120 receives the first response 250, and determines the correct port over which the second response 255 should be transmitted to reach the mobile device 110. The proxy server 120 can identify that the first request 235 was received on port 50000, and thus, the second response 255 should be transmitted on port 50000. However, any other method of determining the port to transmit the second response over may additionally or alternatively be used. Further, the response may be transmitted over a port other than the port assigned to the mobile device 110.

FIG. 3 is an example proxy log 122 table illustrating HTTP requests recorded at the example proxy server 120. The example proxy log 122 includes a device identifier column 310, a source port column 315, a destination port column 320, a timestamp column 330, and an HTTP request column 340. The ellipses (" . . . ") at the bottom of FIG. 3 indicate that the table contains a truncated version of the table for purposes of illustration. Moreover, in the illustrated example of FIG. 3, the example proxy log 122 includes data associated with a single device and a single panelist (e.g., the panelist is represented by the destination port on the proxy server as explained above). However, in practice, the proxy log 122 generated by the proxy server 120 will include data associated with any number of different devices and/or any number of panelists. Further, the example proxy log 122 illustrates an example time period of approximately twenty-eight minutes. However, in practice, the proxy log 122 generated by the example proxy server 120 will include data associated with a longer time frame such as, for example, a hour, a day, a week, month, etc.

The example proxy log 122 of FIG. 3 includes a first row 350, a second row 360, a third row 370, a fourth row 380, a fifth row 390, and a sixth row 395, each of which is associated with a request made to the proxy server 120 by an example mobile device 110. The first example row 350 of the illustrated example of FIG. 3 includes a record that identifies that cPhone 5x associated with the destination port 50000 transmitted an HTTP request at 6:00:00 PM. The first and second example rows 350 and 360 include user agents 342, 343 identifying that the requests were associated with a SportsApp application. The example HTTP request of the example third row 370 includes a user agent 344 identifying that the request was associated with an embedded advertisement application (e.g., EmbAd). The example HTTP request of fourth example row 380 is associated with a Twitter™ application. The fifth example row 390 of the illustrated example of FIG. 3 includes a record that indicates that the cPhone 5x associated with the same port number 50000 transmitted an HTTP request associated with the embedded advertisement application at 6:17:42 PM. The sixth example row 395 includes a record that indicates another HTTP request associated with the Twitter™ application at 6:27 pm.

FIGS. 4A-4F illustrate a graphical depiction of the requests shown in the example proxy log 122 of FIG. 3. FIGS. 4A-4F also illustrate a visual representation of session identification as performed by the example creditor 135.

Figure 4A:
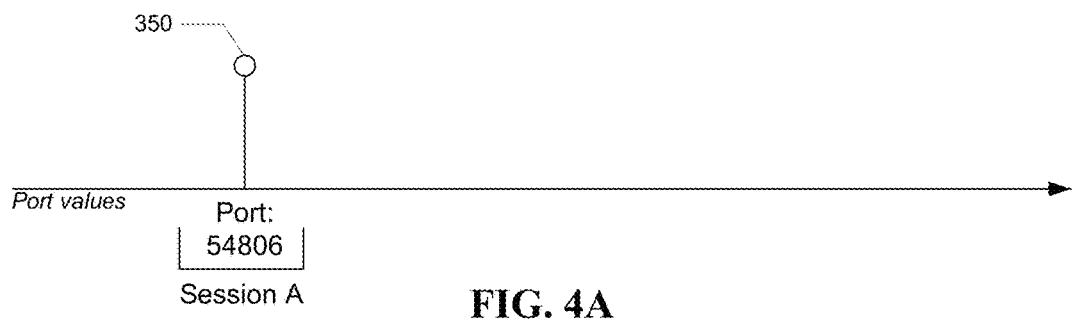
FIGS. 4A, 4B, 4C, 4D, 4E, and 4F are example charts of HTTP requests and sessioning performed by the example creditor of FIG. 1.

Turning to FIG. 4A, the example session classifier 140 of FIG. 1 accesses the first record 350 in the example proxy log 122. The first record 350 originated from port 54806 on the example mobile device 110. The first record 350 is then assigned a new session identifier, "Session A." Accordingly, the identifier "Session A" is associated with the record 350 by the example session classifier 140.

Figure 4B:
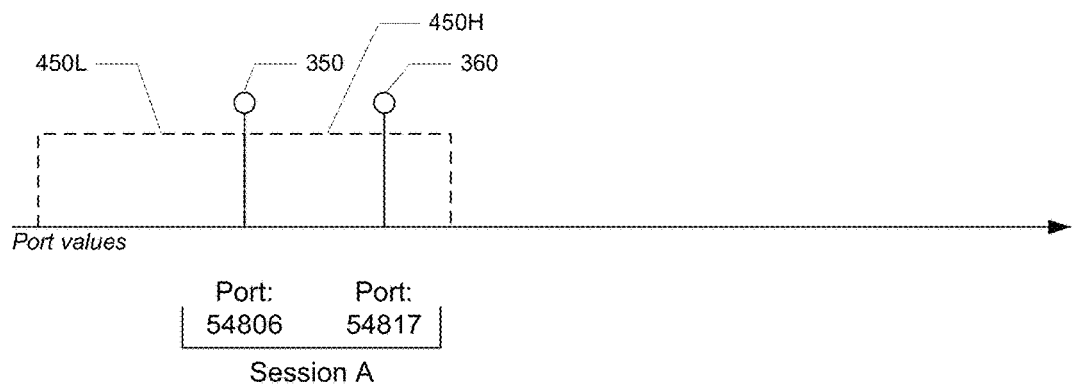

In FIG. 4B, the example session classifier 140 generates session windows 450L and 450H around the first record 350. The session windows 450L and 450H are windows generated to identify if a new record in the proxy log 122 belongs to the same usage session as a previous record. The bounds of the lower session window 450L in the illustrated example are from (1) fifteen ports below example port 54806 to (2) port 54806. The bounds of the upper session window 450H in the illustrated example are from (1) port 54806 to (2) fifteen ports above example port 54806. In the illustrated example, the HTTP requests outside the session windows 450L, 450H are determined to originate from new applications.

The session windows 450L, 450H are applied to the lowest and highest observed port numbers in a session. The session windows are placed on the boundary port numbers in a session in the event that a new port utilized in the usage session expands beyond the currently observed range of port numbers. In the illustrated examples of FIGS. 4B-4F, the port windows are fifteen ports "wide." Any HTTP request having a source port number between the boundary port numbers is considered to be part of the usage session. Accordingly, any HTTP request having a source port number within the session windows is also considered to be a part of the usage session. While the session windows 450L, 450H are illustrated in the example as having a width of 15 ports, the width of the session windows 450L, 450H are configurable to any desired width.

For example, an application may be used for ten minutes on a mobile device by a user, which utilizes one source port 1000. The user suspends the application (e.g., returns to the home screen of a device). When the user returns to the application to resume usage, a new session is started, and, accordingly, a new port is utilized which is at least fifteen ports away (e.g., greater or less than) from port 1000.

Returning to FIG. 4B, the example session classifier 140 accesses the second record 360 in the example proxy log 122 of FIG. 3. The example session classifier 140 determines that the second record 360 is within the session window 450H and, therefore, is also associated with the usage session, Session A. The example session classifier 140 associates the identifier "Session A" to the second record 360.

Figure 4C:
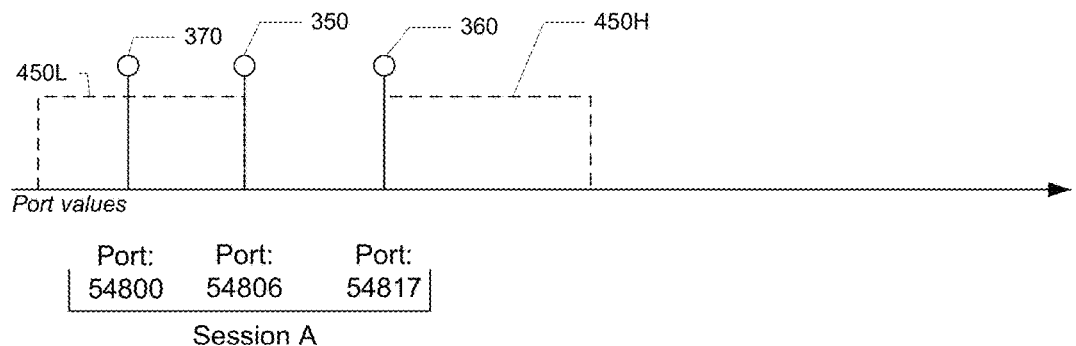

Turning to FIG. 4C, the example session classifier 140, as explained above, moves the session windows 450H and 450L to the highest and lowest observed port number records, the second record 360 and the first record 350. The example session classifier 140 accesses the third record 370. The example session classifier 140 determines that the third record 370 is within the lower session window 450L. Accordingly, the determination indicates that the third record 370 is also associated with "Session A." The example session classifier 140 associates the identifier "Session A" to the third record 370.

Figure 4D:
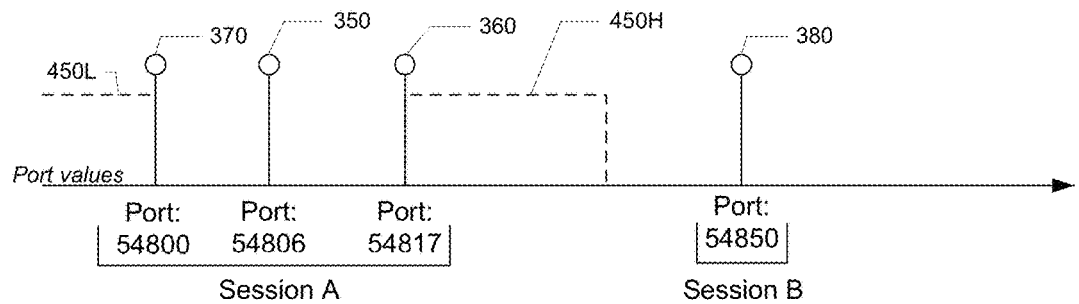

In FIG. 4D, the example session classifier 140 moves the session windows to the new boundary port records. The lower window 450L is associated with the third record 370 and the upper window 450H is associated with the second record 360. The example session identifier accesses the fourth record 380 and determines that the fourth record is beyond both the lower session window 450L and the upper session window 450H. In response to the fourth record 380 being beyond both of the session windows, the example session classifier 140 creates a new session identifier, "Session B." The "Session B" identifier is associated to the fourth record 380.

Figure 4E:
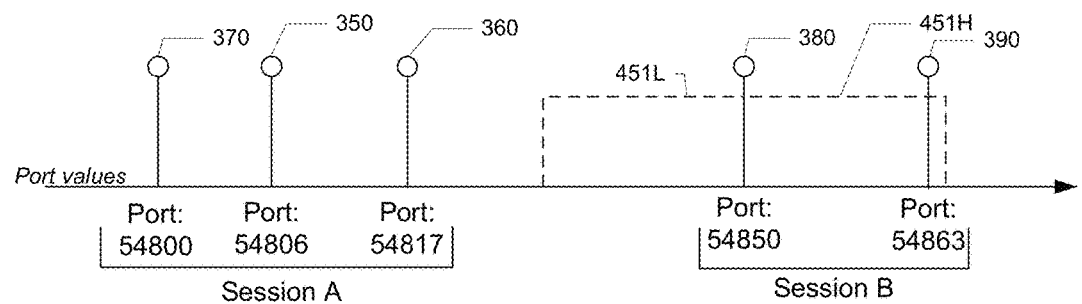

Turning to FIG. 4E, the example session classifier 140 creates new upper and lower session windows 451H and 451L. The example session classifier 140 accesses the fifth record 390 and determines it to be within the session window 451H. as a result, the fifth record 390 is determined to belong to "Session B" and is associated with a corresponding identifier.

In some examples, at least one of the session windows may overlap with a previously sessioned HTTP request record. For example, if lower session window 451L overlapped previously sessioned record 360. In these instances, a previously sessioned HTTP request record is not associated to the new session.

Figure 4F:
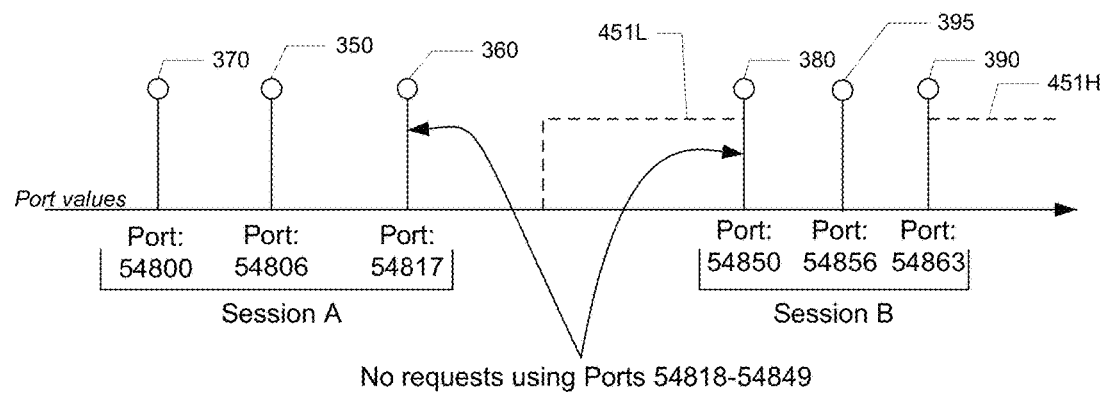

Moving to FIG. 4F, the example session classifier 140 institutes the session windows to the new upper and lower boundary of "Session B." The lower window 451L is associated with the fourth record 380 and the upper window 451H is associated with the fifth record 390. The example session classifier 140 accesses the sixth record 395 and determines that the source port of the sixth record 395 is between the source port of the fourth record 380 and the source port of the fifth record 390. Accordingly, the sixth record 395 is determined as belonging to Session B and has an identifier associated accordingly (e.g., added and/or watermarked into the session).

When a session has been identified, the example records belonging to the session are associated with a session identifier. In some examples, the session identifier is added to the records in an alternate field, or watermarked into the record. In other examples, the records for an identified session are extracted from the example proxy log 122 and stored as an individual collection. In some other examples, the session identifier is added to the user agents in the records of the example proxy log 122.

Figure 5A:
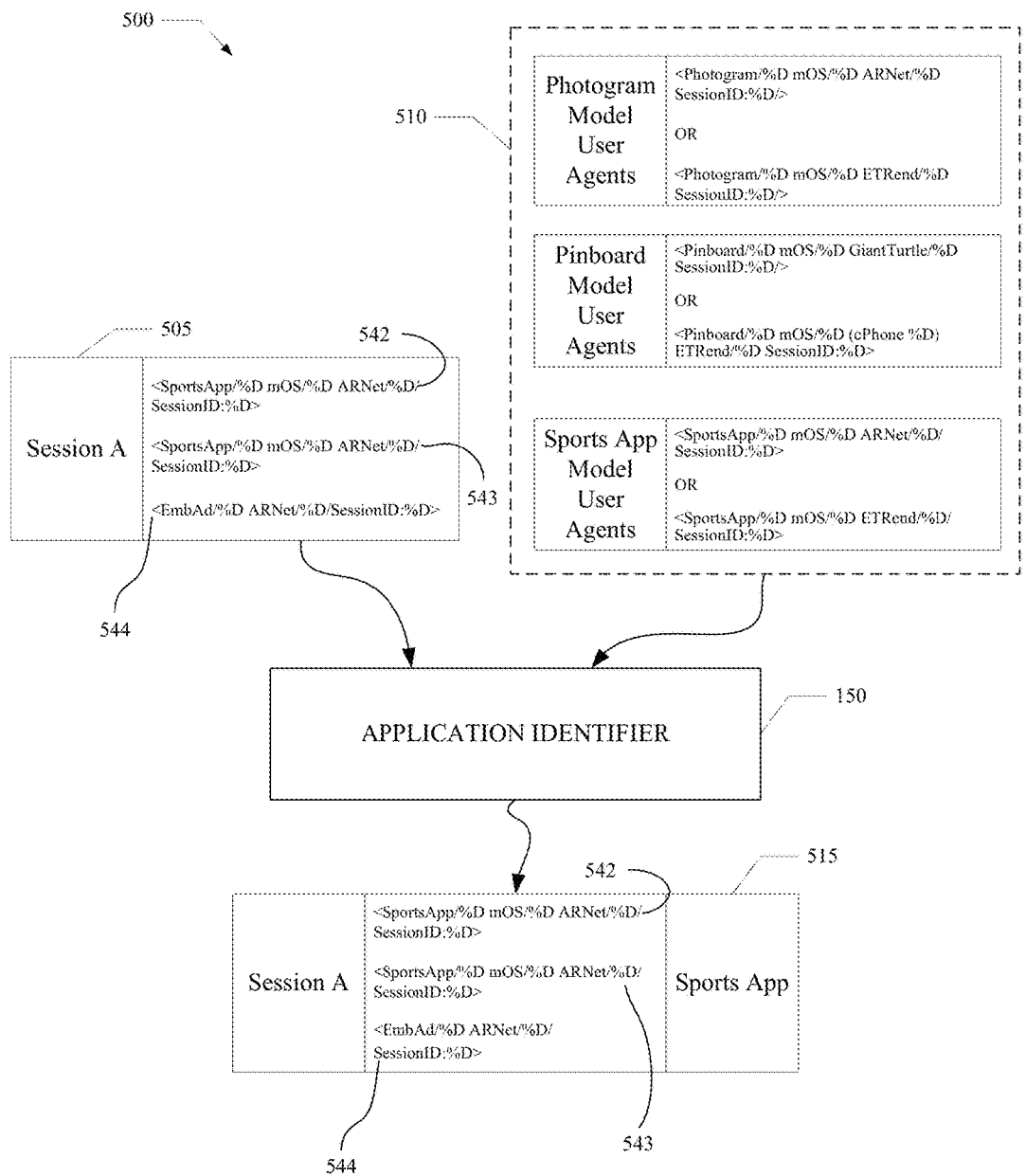
FIG. 5A is an example illustration of session classification performed by the example creditor of FIG. 1.

FIG. 5A is an example block diagram of classification of a session identified by the example session classifier 140. In the illustrated example, the example application identifier 150 obtains the user agent search strings associated with "Session A" 505 generated by the example request filter 145. The example application identifier 150 also obtains application patterns that contain model user agents and URLs associated with application network usage. In the illustrated example, the model user agents 510 which are obtained from the example data store 155 are depicted. The search strings 542, 543, 544 from "Session A" are checked against the retrieved model user agents 510 by the example application identifier 150. In the illustrated example of FIG. 5A, each search string 542, 543, 544 is identified as matching or not matching a model user agent from an application pattern. The application associated with the pattern generating the highest score is identified as the application associated with the session and associated to the session 515.

In the illustrated example, the model user agents 510 are retrieved from the example data store 155. The example model user agents 510 are for Sports App, Pinboard, and Photogram. Each of the example model user agents 510 are compared against the Session A search strings 542, 543, 544. In one example, when a user agent from the session 505 generates a TRUE value from any of the Boolean logic values, the session is then classified by the example application identifier 150 as being associated with the execution of the corresponding application. For example, in the illustrated example of FIG. 5A, the first Sports App user agent 542 would generate a TRUE value when checked against the first user agent in the SportsApp model user agents. Accordingly, Session A 505 is classified as being usage of SportsApp 515.

In some other examples, a matching search string generates a score (e.g., a count of the number of match points) representative of the overall degree of match between the session a search strings and the model user agent. For example, a match to a model user agent generates one point for a match. The two matches between Session A search strings 542, 543 and the Sports App model user agents generates two points, where the Pinboard model user agents and the Photogram model user agents generate no points. Based on the score, the example application identifier 150 classified Session A as being usage associated with Sports App because the Sports App model user agents generated a higher score (e.g., more match points) than any other application model user agents. The identified application (e.g., Sports App) is associated to the Session A records 515.

In some examples, substrings of the user agent data (e.g., SportsApp, mOS, ARNet, etc.) are used to create additional match points for the score. For example, each substring match generates further points. Thus, when using substrings in the illustrated example, matching a user agent would generate three points for a match. In other examples, each individual substring may be weighted (e.g., given more deference in the form of matching points) when a particular substring is more indicative of an application (e.g., the SportsApp substring).

In some other examples, negative Boolean logic may be implemented to provide another level of differentiation between multiple versions of an application. For example, some metered applications have both a "free" and a "paid" version. Typically, in such examples, the user agent of the free version may provide insight to the version (e.g., "SportsApp-Free"). To provide a proper classification between the versions, an override rule (e.g., a "NOT" Boolean logic rule) is implemented in the model user agents. For example, the model user agents of the paid version of SportsApp may contain a rule specifying "NOT <SponsApp-Free/%D . . . >" In such an example, if the free version search string is generates a match during classification, the example application identifier 150 determines that this version cannot be the paid version and begins using other model user agents to classify the session.

In yet other examples, an application may not be classified in a session unless it meets a certain number of user agent matches in a session. For example, a rule in the model user agents may indicate that unless a user agent in a session (e.g., Session A 505) appears a threshold number of times (e.g., three times), the session is not indicative of usage of the associated application. While the rule is not depicted in example FIG. 5, if it were to be implemented using a threshold of three appearances, Session A 505 would not be classified as indicative of SportsApp usage.

Figure 5B:
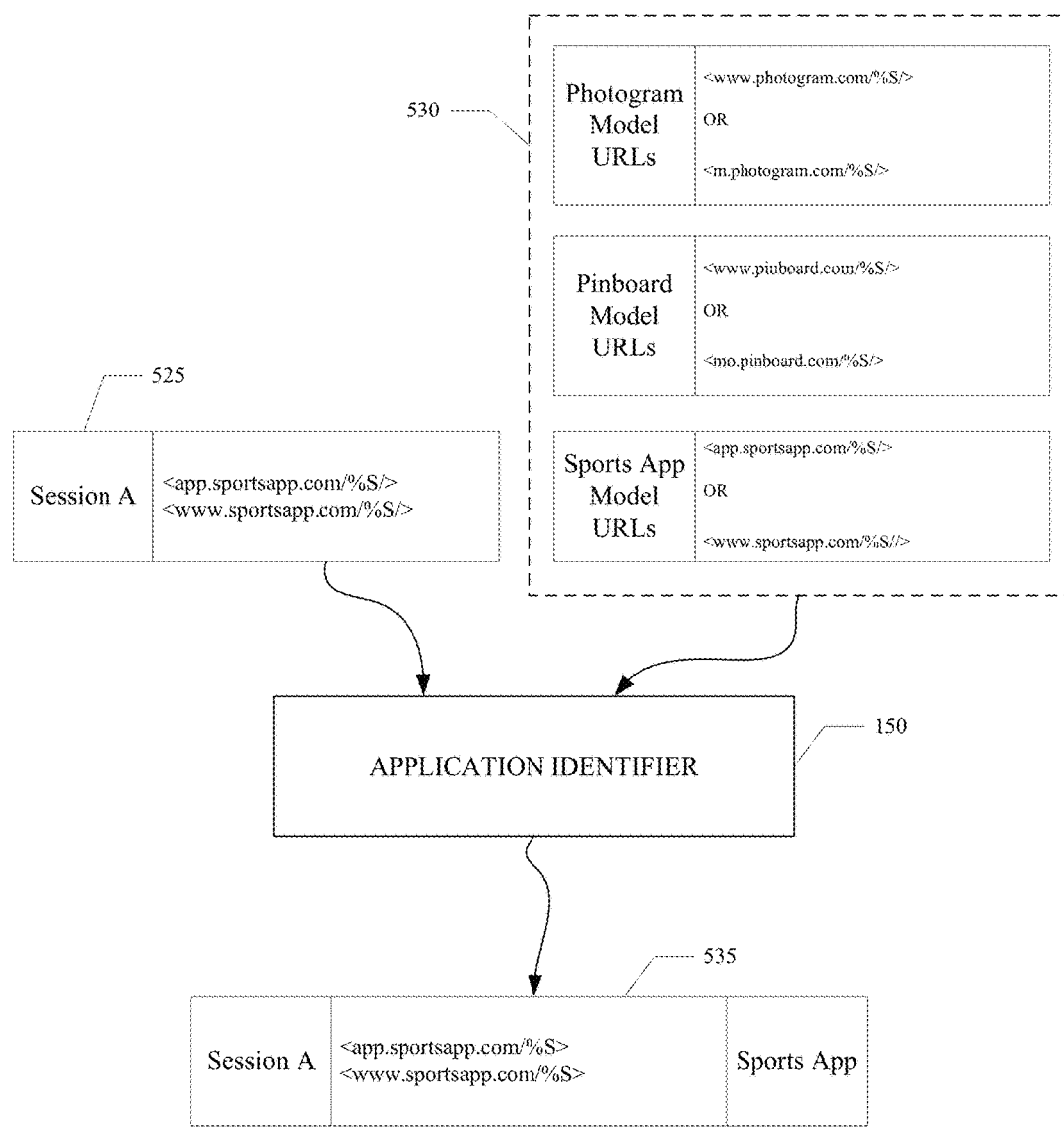
FIG. 5B is an example illustration of classification of sessions performed by the example creditor of FIG. 1.

From the foregoing, it will be appreciated that the same system may be used with URLs instead of user agents when the user agent is not indicative of a specific application as illustrated in example FIG. 5B. For example, some applications use common components (e.g., Web Kit) to obtain certain HTTP requests. In such an example, the user agents contained in the session might all be indicative of the common components of the mobile device 110.

FIG. 5B is an example block diagram of classification of a session identified by the example session classifier 140. In the illustrated example, the example application identifier 150 obtains the search strings of URLs of "Session A" 525 generated by the example request filter 145. The example application identifier 150 also obtains application patterns that contain model user agents and URLs associated with typical HTTP requests resulting from application execution. In the illustrated example, the model URLs 530 are depicted that are obtained from the example data store 155. The search strings of URLs from "Session A" are checked against the retrieved model URLs 530 by the example application identifier 150. In the illustrated example of FIG. 5B, each search string is identified as matching or not matching the current rule of an application pattern. The application associated with the pattern generating the highest score is identified as the application associated with the session and associated to the session 525.

In the illustrated example, the model URLs 530 are retrieved from the example data store 155. The example model URLs 530 are for Sports App, Pinboard, and Photogram. Each of the example model URLs 530 are checked against the Session A search strings 525. When a URL from the session 525 generates a TRUE value from any of the Boolean logic values, the session is then classified by the example application identifier 150 as being associated with the execution of the corresponding application. For example, in the illustrated example of FIG. 5B, the first Sports App URL would generate a TRUE value when checked against the first URL in the Sports App model URLs. Accordingly, Session A 525 is classified as being usage of Sports App 535.

In some other examples, a matching URL generates a point for a match to a model URL. The two matches between Session A search strings 525 and the Sports App model URLs generate a score of two points, where the Pinboard model URLs and the Photogram model URLs generate a score of no points. Based on the score, the example application identifier 150 classified Session A as being usage associated with Sports App because the Sports App model URLs generated more a higher score than any other application. The identified application is then associated to the Session A records 535.

Figure 6:
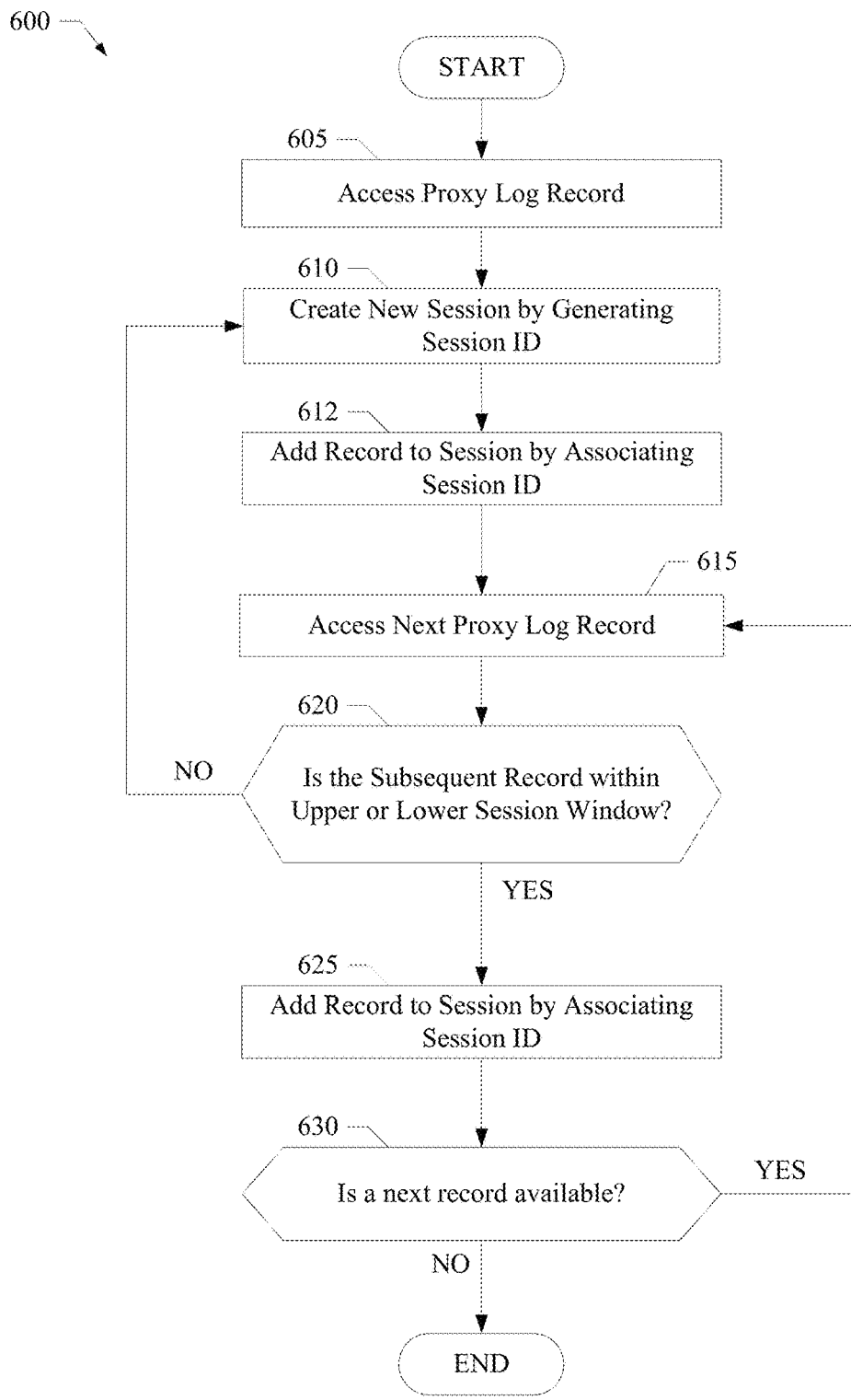
FIG. 6 is a flow diagram representative of example machine readable instructions that may be executed to implement the example creditor of FIG. 1 to form a session from the records in the proxy log.
Figure 7:
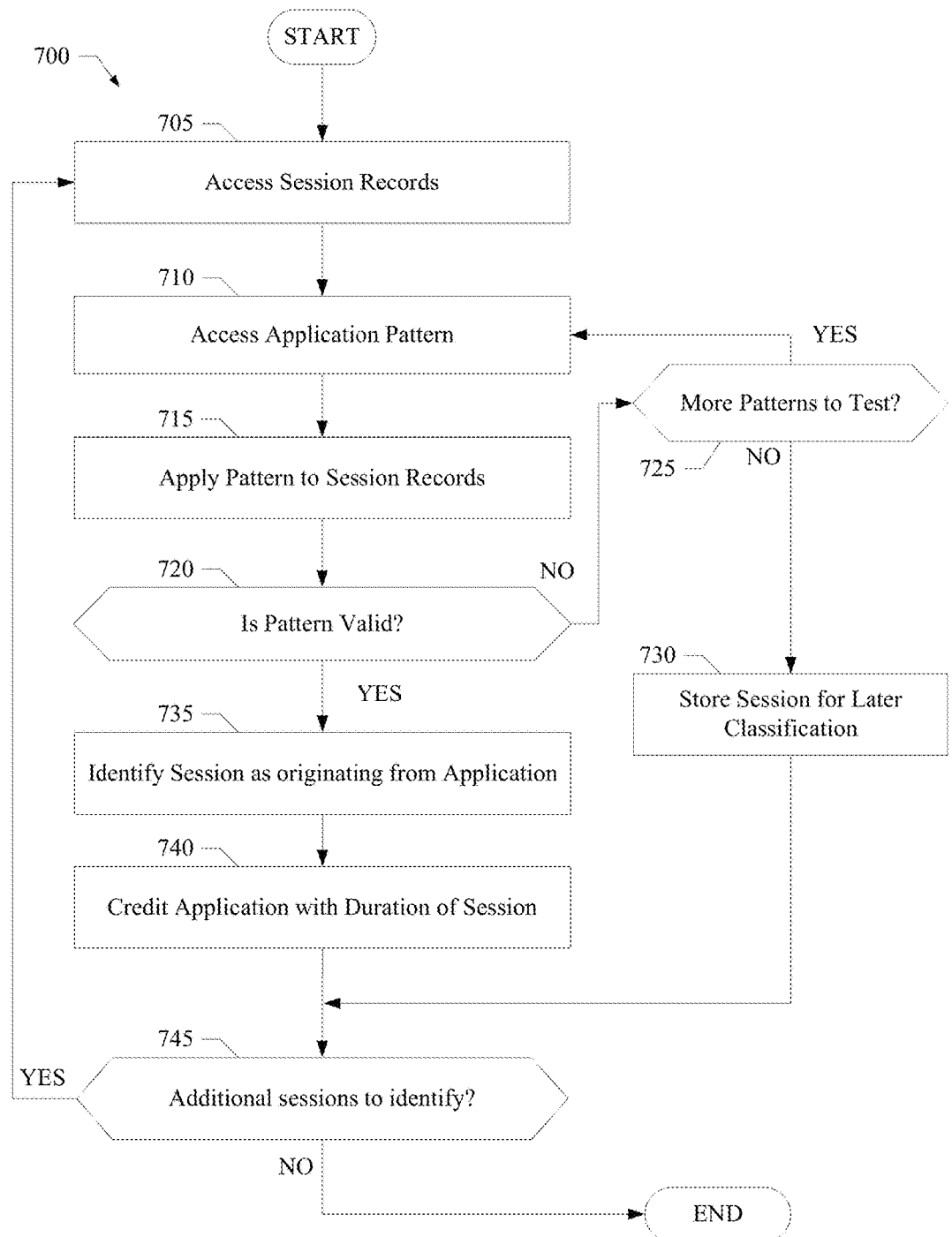
FIG. 7 is a flow diagram representative of example machine readable instructions that may be executed to implement the example creditor of FIG. 1 to associate sessions to applications.

Flowcharts representative of example machine readable instructions for implementing the example creditor 135 of FIG. 1 are shown in FIGS. 6 and 7. In these examples, the machine readable instructions comprise a program for execution by a processor such as the processor 1012 shown in the example processor platform 1000 discussed below in connection with FIGS. 6 and 7. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6 and 7, many other methods of implementing the example creditor 135 may alternatively be used. For example, the order of execution of the blocks may be changed, and/or some of the blocks described may be changed, eliminated, or combined.

As mentioned above, the example processes of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of example machine readable instructions that may be executed to implement the example creditor 135 of FIG. 1. The example program 600 may be initiated, for example, when the example proxy log 122 is accessed, received, and/or obtained at the example creditor 135 from the example proxy server 120.

Initially, the example session classifier 140 accesses a record from the proxy log 122 (block 605). The example session classifier 140 then provisions a new session identifier to associate with the accessed record and associates the identifier to the accessed record (block 610). The accessed record is associated with the new session ID by the example session classifier 140 (block 612). The example session classifier 140 accesses the next record in the proxy log 122 (block 615). A determination is made by the example session classifier 140 of whether the record accessed (e.g., at block 615) is within the port range and/or within the session windows 450L and 450H (block 620).

If the determination made by the example session identifier 140 is that the record is not within the port range and/or the session windows, the example session classifier 140 generates a new session identification and associates it to the record (e.g., returns to block 610). However, if the record is determined to be within the port range and/or the session windows, the example session identifier associates the current session identifier to the record effectively adding it to the current session (block 625). The example session identifier then determines if any records remain in the proxy log 122 (block 630). If the example session classifier 140 determines that more records remain, the example session classifier 140 continues processing the proxy log 122 (e.g., returns to block 615). If no other records are determined to remain, the example session classifier 140 sends the sessioned proxy log 122 to the example request filter 145 for generating wildcarded search strings. After the transmission of the sessioned proxy log 122, the example flowchart 600 terminates until such a time that a new proxy log 122 arrives at the example creditor 135.

FIG. 7 is a flowchart representative of example machine readable instructions that may be executed to implement the example creditor 135 of FIG. 1. The example program 700 may be initiated, for example, when the example proxy log 122 has been sessioned by the example session classifier 140 of the example creditor 135 of FIG. 1.

The example program 700 begins when the example application identifier 150 receives (or obtains) the wildcarded search strings from the example request filter 145 (block 705). The example application identifier 150 accesses the application patterns indicative of application usage (e.g., the model user agents, URLs, minimum detections, etc.) from the example data store 155 (block 710). The example application identifier 150 begins applying one of the application patterns to each of the search strings of the session record (e.g., the records accessed at block 705). In some examples (e.g., match points), every search string from a session is tested against the application patterns. In other examples, the search strings are evaluated in a session until a TRUE value is detected.

If the example application identifier 150 determines that the applied application pattern does not match (e.g., does not evaluate as true) (block 720) then the example application identifier 150 determines if there are more patterns in the example data store 155 to apply to the session record (block 725). If no patterns are left to test, the example application identifier 150 stores the unclassified session in the data store for a later attempt at processing (block 730). If there are more patterns to test, the example application identifier 150 accesses the additional patterns from the example data store 155 (block 710).

In some examples, the example application identifier 150 will determine if there are enough patterns tested to make a determination on matching points (block 720). If a threshold number of application patterns have accumulated matching points, the application identifier 150 determines the application pattern having the most matching points and moves to associate the session with the corresponding application (block 735). If the threshold number of application patterns have not accumulated points, the example application identifier 150 will continue testing application patterns (block 725).

Returning to block 720, if the example application identifier 150 determines that the pattern is valid (e.g., evaluates as true), the session is classified as usage associated with the matching application (block 735).

Accordingly, the classified session is transmitted to the example reporter 160 which credits the application with usage from the session duration (block 740). In the illustrated example, the earliest timestamp of the records in the session is subtracted from the latest timestamp in the records to determine a total usage time of the session. The example application identifier 150 then determines if additional sessions in the proxy log 122 (or the example data store 155) exist that need to be classified (block 745). If there are additional sessions that require classification, the sessions are accessed by the example application identifier 150 (e.g., return to block 705). If no additional session require classification, the example program 700 terminates.

Figure 8:
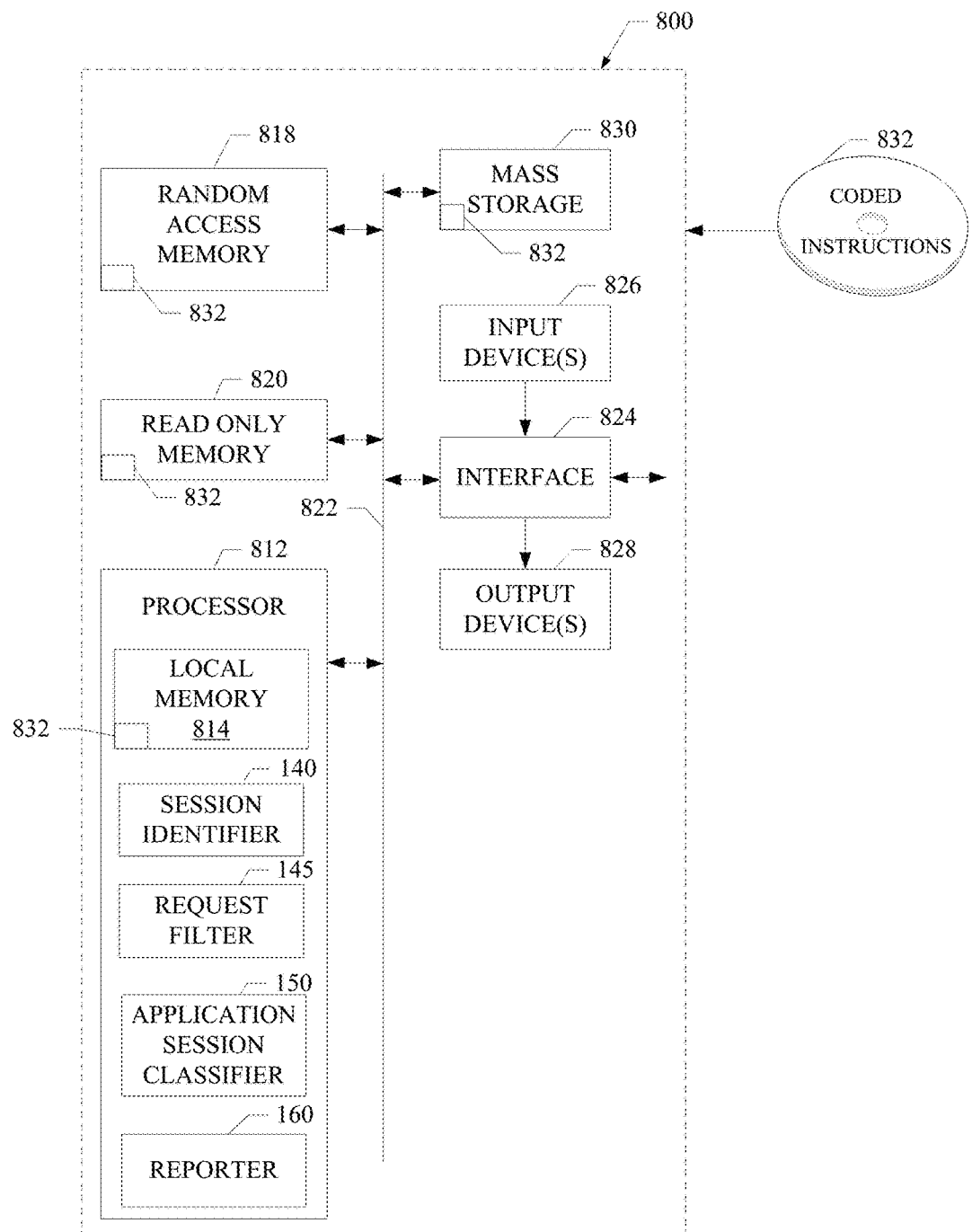
FIG. 8 is a block diagram of an example processor system that may execute any of the machine readable instructions represented by FIGS. 6 and 7 to implement the example creditor of FIG. 1.

FIG. 8 is a block diagram of an example processor platform 1000 capable of executing the instructions of FIGS. 6 and 7 to implement the example creditor 135 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The processor also includes an example session classifier 140, an example request filter 145, an example application identifier 150, and an example reporter 160.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 6 and 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture credit applications by port clustering. The disclosed examples provide the ability to remotely monitor a device in a monitoring panel. By instituting the monitoring remotely, precious system memory, processing power, battery power, and network bandwidth are released to the device no longer acting as a platform for on-device monitoring. The extra system memory and processing power greatly improve the functioning of the now remotely monitored devices. The extra resources further allow the mobile device to perform tasks faster and in some instances, more efficiently, than in other examples.

The disclosed examples also facilitate conservation of bandwidth in a monitored household. The disclosed examples may be used to consume bandwidth outside of the information flow of the household. In a household with limited bandwidth, by remotely monitoring the execution of applications, an audience measurement entity would not consume excess bandwidth by persistent transmission of proxy log 122s to the example creditor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a means for identifying a first request, from a first device, the first request having a first source port number;
a means for determining whether a second request, having a second source port number, is within a threshold number of ports from the first source port number;
a means for grouping the first and the second requests as a first session when the second source port number is within the threshold number of ports from the first source port number;

a means for determining whether a third request, having a third port number, is at least one of: (1) within a lower session window from a lower of the first and the second source port number, (2) within an upper session window from a higher of the first and the second source port number, and group the third request in the first session; and a means for identifying an application associated with the first session.

2. The apparatus as defined in claim 1, wherein when the user agent of the first request does not match an application pattern associated with any application and a uniform resource locator (URL) matches the first application pattern associated with the first application, the means for identifying an application is to identify the application as the first application.

3. The apparatus as defined in claim 1, wherein the numerical value corresponds to a version number, an iteration number or a release number.

4. The apparatus as defined in claim 1, wherein the first application pattern includes a plurality of wildcards in multiple location corresponding to a plurality of numerical values in the user agent.

5. The apparatus as defined in claim 1, further including a means for crediting the use of the application during the first session.

6. The apparatus as defined in claim 1, wherein requests are not processed on the first device.

7. The apparatus as defined in claim 6, wherein requests are processed at a proxy server intermediate to the first device associated with a panelist generating requests and a media provider providing the media to the first device.

8. A non-transitory computer readable medium comprising instructions that, when executed, cause a machine to, at least:

identify a first request having a first source port number, from a device;

determine whether a second request, having a second source port number, is within a threshold number of ports from the first source port number;

group the first and the second requests as a first session when the second source port number is within the threshold number of ports from the first source port number; and identify an application associated with the first session as a first application when a user agent of the first request matches a first application pattern associated with the first application, the first application pattern including a wildcard in a location corresponding to a numerical value in the user agent.

9. The non-transitory computer readable medium as defined in claim 8, further including instructions that, when executed, cause the machine to, when the user agent of the first request does not match an application pattern associated with any application and a uniform resource locator (URL) matches the first application pattern associated with the first application, identify the application as the first application.

10. The non-transitory computer readable medium as defined in claim 8, wherein the numerical value corresponds to a version number, an iteration number or a release number.

11. The non-transitory computer readable medium as defined in claim 8, wherein the first application pattern includes a plurality of wildcards in multiple locations corresponding to a plurality of numerical values in the user agent.

12. The non-transitory computer readable medium as defined in claim 8, further including instructions that, when executed, cause the machine to credit use of the application during the first session.

13. The non-transitory computer readable medium as defined in claim 8, wherein requests are not processed on the device.

14. The non-transitory computer readable medium as defined in claim 13, wherein requests are processed at a proxy server intermediate to the device associated with a panelist generating requests and a media provider providing the media to the device.

15. A method comprising:

identifying, by executing an instruction with a processor, a first request having a first source port number, from a device;

determining, by executing an instruction with the processor, whether a second request, having a second source port number, is within a threshold number of ports from the first source port number;

grouping, by executing an instruction with the processor, the first and the second requests as a first session when the second source port number is within the threshold number of ports from the first source port number; and identifying, by executing an instruction with the processor, an application associated with the first session as a first application when a user agent of the first request matches a first application pattern associated with the first application, the first application pattern including a wildcard in a location corresponding to a numerical value in the user agent.

16. The method as defined in claim 15, wherein when the user agent of the first request does not match an application pattern associated with any application and a uniform resource locator (URL) matches the first application pattern associated with the first application, identifying the application as the first application.

17. The method as defined in claim 15, wherein the numerical value corresponds to a version number, an iteration number or a release number.

18. The method as defined in claim 15, wherein the first application pattern includes a plurality of wildcards in multiple locations corresponding to a plurality of numerical values in the user agent.

19. The method as defined in claim 15, further including crediting use of the application during the first session.

20. The method as defined in claim 15, wherein requests are processed at a proxy server intermediate to the device associated with a panelist generating requests and a media provider providing the media to the device.

* * * * *